US011181630B2

(12) United States Patent
Weiner

(10) Patent No.: US 11,181,630 B2
(45) Date of Patent: Nov. 23, 2021

(54) HIGH-THROUGHPUT WIRELESS COMMUNICATIONS ENCODED USING RADAR WAVEFORMS

(71) Applicant: Massachusetts Institute of Technology, Cambridge, MA (US)

(72) Inventor: Ian Weiner, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 96 days.

(21) Appl. No.: 16/852,005

(22) Filed: Apr. 17, 2020

(65) Prior Publication Data

US 2020/0333450 A1 Oct. 22, 2020

Related U.S. Application Data

(60) Provisional application No. 62/836,457, filed on Apr. 19, 2019.

(51) Int. Cl.
*G01S 13/53* (2006.01)
*G01S 13/42* (2006.01)
*G01S 13/50* (2006.01)

(52) U.S. Cl.
CPC ............ *G01S 13/53* (2013.01); *G01S 13/42* (2013.01); *G01S 13/505* (2013.01)

(58) Field of Classification Search
CPC ......... G01S 13/53; G01S 13/42; G01S 13/505
USPC .......................................................... 342/59
See application file for complete search history.

(56) References Cited

U.S. PATENT DOCUMENTS

| 6,990,087 | B2* | 1/2006 | Rao | H04W 16/10 370/330 |
| 7,376,688 | B1* | 5/2008 | von der Embse | G06F 17/148 708/300 |
| 8,326,313 | B2* | 12/2012 | McHenry | H04W 16/14 455/454 |
| 8,330,650 | B2* | 12/2012 | Goldman | G01S 13/42 342/160 |
| 8,976,851 | B2* | 3/2015 | Hadani | H04L 5/0016 375/229 |
| 9,130,638 | B2* | 9/2015 | Hadani | H04L 5/0044 |
| 9,712,354 | B2* | 7/2017 | Hadani | H04L 27/2634 |
| 9,912,507 | B2* | 3/2018 | Rakib | H04L 5/0007 |

(Continued)

FOREIGN PATENT DOCUMENTS

| EP | 2865153 A1 * | 4/2015 | ......... H04L 27/2634 |
| WO | 2021011043 A2 | 1/2021 | |

OTHER PUBLICATIONS

PCT International Search Report and Written Opinion for International Application No. PCT/US2020/028822, entitled "High-Throughput Wireless Communications Encoded Using Radar Waveforms," dated Jan. 13, 2021.

(Continued)

*Primary Examiner* — Bernarr E Gregory
*Assistant Examiner* — Nuzhat Pervin
(74) *Attorney, Agent, or Firm* — Hamilton, Brook, Smith & Reynolds, P.C.

(57) ABSTRACT

A high-throughput communications channel is encoded using transmit waveforms which satisfy a variety of technical constraints deemed desirable for effective radar operations and signal processing. This enables new cooperative spectrum sharing modalities for radar and communications systems.

22 Claims, 13 Drawing Sheets

(56) References Cited

U.S. PATENT DOCUMENTS

| | | | |
|---|---|---|---|
| 9,929,783 B2* | 3/2018 | Rakib | H04L 27/2639 |
| 9,967,758 B2* | 5/2018 | Hadani | H04L 27/3488 |
| 10,003,487 B2* | 6/2018 | Rakib | H04L 27/2639 |
| 10,090,973 B2* | 10/2018 | Hadani | H04L 27/2602 |
| 10,476,564 B2* | 11/2019 | Hadani | H04B 1/12 |
| 10,637,697 B2* | 4/2020 | Hadani | H04L 27/2655 |
| 2003/0210680 A1* | 11/2003 | Rao | H04L 47/14 370/352 |
| 2010/0075704 A1* | 3/2010 | McHenry | H04B 7/022 455/509 |
| 2010/0097952 A1* | 4/2010 | McHenry | H04W 16/14 370/252 |
| 2010/0105332 A1* | 4/2010 | McHenry | H04W 16/14 455/62 |
| 2010/0173586 A1* | 7/2010 | McHenry | H04L 27/0006 455/62 |
| 2013/0009804 A1* | 1/2013 | Valentine | G01S 13/66 342/146 |
| 2014/0169433 A1* | 6/2014 | Hadani | H04L 5/0016 375/229 |
| 2014/0169441 A1* | 6/2014 | Hadani | H04B 7/005 375/233 |
| 2015/0268328 A1* | 9/2015 | Johnson | G01S 7/02 342/21 |
| 2016/0033622 A1* | 2/2016 | Martone | G01S 7/0232 342/18 |
| 2016/0191280 A1* | 6/2016 | Hadani | H04B 7/005 375/233 |
| 2016/0224951 A1* | 8/2016 | Hoffberg | G06Q 20/308 |
| 2017/0201889 A1* | 7/2017 | McHenry | H04L 27/0006 |
| 2017/0207817 A1* | 7/2017 | Hadani | H04L 27/2655 |
| 2017/0346665 A1* | 11/2017 | Hadani | H04L 27/2655 |
| 2018/0234863 A1* | 8/2018 | Li | H04L 1/0009 |
| 2020/0036487 A1* | 1/2020 | Hammond | G01S 7/023 |
| 2021/0055374 A1* | 2/2021 | Dokhanchi | G01S 7/006 |

OTHER PUBLICATIONS

Tan, et al., "On higherorder representations of polyphase-coded fm radar waveforms," in Radar Conference (RadarCon), 2015 IEEE. IEEE, 2015, pp. 0467-0472.

Weiner, Ian, "High-SNR Channel Capacity for Communication Over Radar Waveforms", IEEE Transactions on Aerospace and Electronic Systems, 2018, 10.1109/TAES.2018.2884858.

Weiner, Ian, "High-throughput communications modulated over radar transmit waveforms," 2019 IEEE Radar Conference (RadarConf), PowerPoint Presentation, Apr. 22-26, 2019.

Weiner, Ian, "High-throughput communications modulated over radar transmit waveforms," Massachusetts Institute of Technology, No date available.

Weiner, "High-snr capacity of awgn channels with generic alphabet constraints," Ph.D. Dissertation, Harvard School of Engineering and Applied Sciences, Cambridge, 2016.

Weiner, Ian, "CONCORD Field Test: Methodology and Results", Massachusetts Institute of Technology, 2020.

"A programme worth watching," Mar. 2013. [Online]. Available:https://www.economist.com/news/science-and-technology/21573527-how-air-traffic-control-can-use-television-signals-plot-aircraftprogramme, 2 Pages.

Bhat, et al., "Bandwidth sharing and scan scheduling in multimodal radar with communications and tracking," IETE Journal of Research, vol. 59, No. 5, pp. 551-562, 2013.

Blunt, M. R. Cook, and J. Stiles, "Embedding information into radar emissions via waveform implementation," in Waveform Diversity and Design Conference (WDD), 2010 International. IEEE, 2010, p. 000 195-000 199.

Chiriyath, et al., "Inner bounds on performance of radar and communications co-existence." IEEE Trans. Signal Processing, vol. 64, No. 2, pp. 464-474, 2016.

Cook, S. D. Blunt, and J. Jakabosky, "Optimization of waveform diversity and performance for pulse-agile radar," in Radar Conference (RADAR), 2011 IEEE. IEEE, 2011, pp. 812-817.

Gilbert, et al., "Optimum design of directive antenna arrays subject to random variations," Bell System Technical Journal, vol. 34, No. 3, pp. 637-663, 1955.

Jamil, et al., "On integrated radar and communication systems using oppermann sequences," in Military Communications Conference, 2008. MILCOM 2008. IEEE. IEEE, 2008, pp. 1-6.

Landau, et al., "Prolate spheroidal wave functions, fourier analysis and uncertainty—iii: the dimension of the space of essentially time-and band-limited signals," Bell System Technical Journal, vol. 41, No. 4, pp. 1295-1336, 1962.

Richmond, et al., "Performance bounds on cooperative radar and communication systems operation," 2016 IEEE Radar Conference (RadarConf).

Sahin, et al., "A novel approach for embedding communication symbols into physical radar waveforms," IEEE Radar Conference, May 2017, pp. 1498-1503.

Sahin, et al., "Filter design to address range sidelobe modulation in transmit-encoded radar-embedded communications," in Radar Conference (RadarConf), 2017 IEEE. IEEE, 2017, pp. 1509-1514.

* cited by examiner

HIGH-THROUGHPUT WIRELESS COMMUNICATIONS ENCODED USING RADAR WAVEFORMS

RELATED APPLICATION(S)

This application claims the benefit of U.S. Provisional Application No. 62/836,457, filed on Apr. 19, 2019. The entire teachings of the above application(s) are incorporated herein by reference.

GOVERNMENT SUPPORT

This invention was made with government support under Air Force Contract No. FA8702-15-D-0001 from the United States Air Force. The government has certain rights in the invention.

BACKGROUND

A need exists for a capability to utilize existing radar signals and/or transmitters as carriers for high throughput wireless communications. However, good radar performance desires the use of a few specialized radar waveforms while good communication performance desires the use of many waveforms for high throughput. It is desirable to create signals that can be used for both radar and wireless communications without limiting performance or functionality of either. There exists a need to be able to identify and define a set of waveforms that compose a communications alphabet that conform to the specific waveform requirements required for radar performance and/or other needs.

Existing methods attempt to share the spectrum used by the radar transmitter and avoid cross-interference with time or frequency division schemes. However, spectrum-sharing based on time or frequency division do not allow simultaneous operation of radar and communications functionality without significant reduction in performance, which is a significant limitation. Alternative existing methods that involve radars transmitting "traditional" communications signals in tandem with traditional radar waveforms require a significant reduction in communications signal power to avoid interference with radar operation, another significant limitation.

Some prior art has attempted to directly encode communications data into waveforms suitable for radar. However, these attempts rely on traditional communications signals, which are sub-optimal for radar. Namely, the range sidelobes and Doppler tolerance of "traditional" communications signals are known to be poor for radar use. All existing prior art methods require significant performance trade-offs between radar and communication performance.

There exists a need for a high-throughput communications channel to be encoded using transmit waveforms which satisfy a variety of technical constraints deemed desirable for effective radar operations and signal processing.

SUMMARY

A system having an input configured to receive waveform constraints, the waveform constraints defining a set of optimal waveforms within a multidimensional vector space, each point within the multidimensional vector space representing a waveform of a pulse time and a bandwidth. The system also includes a backend configured to determine a manifold, in the multidimensional vector space, composed of the set of optimal radar waveforms, select a base point on the manifold, and identify a communication plane containing the point on the manifold.

The system further includes an encoder configured to select a communication waveform contained in the communication plane representing communications data and determine, based on the selected communication waveform, a desired waveform pulse located on the manifold, the desired waveform pulse representing the communication data of the selected communication waveform. The system includes a transmitter configured to emit the desired waveform pulse.

The system's transmitter may be a radar transmitter and the waveform constraints may be radar performance specifications. The radar performance specifications may include quantities characterizing the optimal achievable responses of waveforms to range and/or Doppler filters. The radar performance specifications may also include quantities characterizing the optimal achievable responses of waveforms to a computationally-desirable subset of range and/or Doppler filters. In such embodiments, the system may also include a radar receiver configured to receive a return signal of the emitted desired waveform pulse and measure at least one of its time delay and Doppler shift.

The communication plane may be tangent to the manifold. In such embodiments, for both the selected communication waveform and the desired waveform, the communication data is represented by displacement from the base point in along directions tangent to the manifold.

The backend may be further configured to define a local region of the communication plane containing a set of communications waveforms that compose an alphabet of communications data, the set of communications waveforms including the selected communications waveform. In such embodiments, the backend may be configured to define a boundary of the region of the communication plane communications plane based upon the geometry of the manifold.

The backend may be further configured to select the base point on the manifold based on second order operations performed on the manifold.

The encoder may be configured to determine the desired waveform pulse by determining a point of intersection of a normal line to the communication plane, at the selected communication waveform, with the manifold, the point of intersection representing the desired waveform pulse.

The backend may be configured to select at least one additional base point on the manifold and identify additional communication planes containing the additional base points and; the encoder is further configured to utilize a multilevel encoding scheme with the choice of communication plane representing additional communication data.

The backend may be further configured to o determine an additional manifold in the multidimensional vector space, composed of an additional set of waveforms defined by additional waveform constraints, the manifold being a sub-manifold of the additional manifold and the set of optimal waveforms being a subset of the additional set of waveforms. The additional waveform constraints may require constant modulus waveforms.

A communication device having an input configured to receive waveform constraints, the waveform constraints defining optimal waveform. The communication device also including a processor configured to select a base waveform from the optimal waveforms, determine a communication plane containing the base waveform, map communication data to a set of communication waveforms in the communications plane, and project the set of communication waveforms onto a subset of the optimal waveforms.

The communication device also including a transmitter configured to emit a waveform from the subset of optimal waveform, the emitted waveform satisfying the waveform constraints and inducing transmitted communication data. The communication device further including a decoder configured to receive the emitted radar waveform and determine the transmitted communications data based on a reverse projection of the emitted radar waveform onto the communication plane.

The communication device processor may be comprised of a backend and an encoder. The optimal waveforms may comprise a parameterized manifold and the subset of optimal waveforms comprise a local patch of the parameterized manifold.

The decoder of the communication device may be further configured to determine additional communications data based on selection of the base waveform.

A radar device including a memory storing a set of radar waveforms defined by waveform constraints and a communication plane surrounding a base waveform from the set of radar waveforms, the communication plane containing a set of communication waveforms representing communication data. The radar device also including an encoder configured to select a commutation waveform and project the selected communications waveform onto a desired waveform from the set of radar waveforms defined by waveform constraints. The radar device further includes a radar receiver detect a reflection of the emitted desired waveform.

The radar transmitter of the radar device may also be the radar receiver. In such embodiments the radar transmitter may utilize simultaneous transmit and receive technology. The waveform contraints may include quantities characterizing the optimal achievable responses of waveforms to range and/or Doppler filters.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
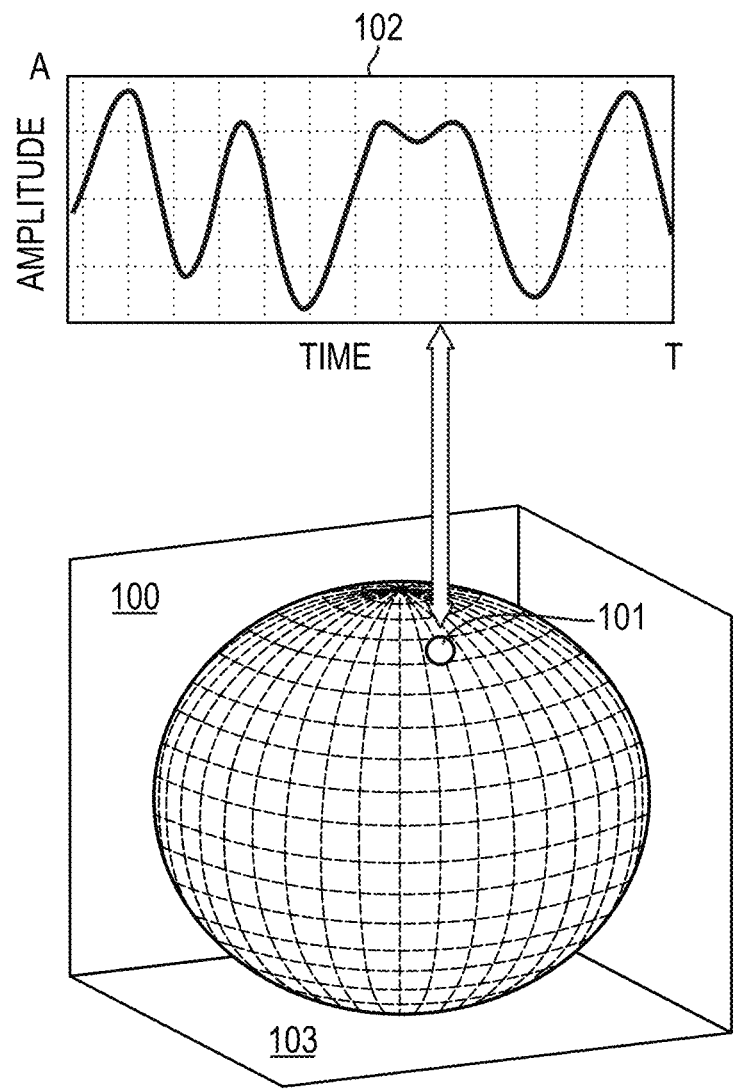
FIG. 1 is a three-dimensional visualization of a multidimensional vector space where each point represents a waveform of a fixed pulse duration and spectral concentration (bandwidth).

A description of example embodiments follows.

Embodiments of the invention include three elements: I) a method of computing a structured mathematical parameterization of a communications alphabet consisting of desirable radar waveforms; II) a method of real-time encoding binary communications data into choice of transmit waveform, achieving high throughputs at medium-to-high-signal to noise ratio ("SNR"); and III) a method of real-time decoding the noisy waveforms at a distant communications receiver.

The invention enables new and improved cooperative spectrum sharing modalities for radar and communications systems. Embodiments of the invention can also be utilized with range-finding systems other than radar such as but not limited to sonar systems. This includes but is not limited to radar systems capable of acting as a wireless communications relay during normal radar operation with extremely low impact on baseline radar detection/tracking performance, wireless communications transmitters such as TV or cell towers which utilize waveforms which are significantly optimized for passive radar applications with extremely low impact on baseline communications throughputs, efficient use of scarce radio spectrum, unified hardware for radar and communications systems on platforms requiring both, and/or networked radar systems in communications with one another to share data.

Radar systems emit waveform pulses ("radar signals") used to detect objects based upon the pulses' reflection off the objects. Because of the nature of radar, some waveforms when used as radar signals are better for radar performance than others. Depending upon the type, purpose, and other factors the set of waveforms that provide good radar performance may change and/or become extremely limited.

Communications signals use specific waveforms to represent (encode) information/data. A communications alphabet is a set of waveforms where each waveform of the set represents different information/data. A string of waveforms can be transmitted in sequence to transmit a message similar to how letters can be combined to form words. The greater number of waveforms that form the communications alphabet, the more data that can be encoded in each waveform "letter" and the higher the throughput of the communication signal. Therefore, communications signals are optimized when they can use many waveforms. Additionally, the greater the differences between the set of waveforms in the communications alphabet, the lower the signal-noise ratio required of the communications signal for error-free decoding. Therefore, communications signals are further optimized when they can transmit many non-similar waveforms. Many standard/known communications techniques require a communications alphabet composed of at least a certain number of waveforms arranged in certain orderly mathematical configurations in order to achieve optimal performance. It is often desirable to use standard/known communications techniques because they approach the theoretical limit for throughput and signal-to-noise ratio ("SNR").

It is possible to produce joint radar and communication signals where each radar waveform pulse is also a waveform that represents communications data. However, communications signals require a set of waveforms that compose an alphabet and this set must be large enough to achieve meaningful throughput and low error rate. In contrast, to retain optimal radar performance, the radar waveform pulses need to be limited by a multitude of factors, particularly quantities characterizing the optimal achievable responses of the waveforms to range and Doppler filters. Both radar and communications waveforms must also obey constraints on bandwidth usage and spectral leakage. Other range-finding systems may require waveform pulses limited by similar or additional performance requirements.

To achieve high throughput wireless communication encoded in radar-suitable waveforms, it is necessary to identify a set of waveforms that can serve as a communications alphabet, where a typical waveform pulse train drawn randomly from the set of waveforms can be effectively utilized for radar functionality, such as target detection and tracking. Applicant's invention includes a method, and corresponding system capable of executing that method, to algorithmically determine a communication alphabet consisting of a set of waveforms that meet specific desirable criteria. The specific criteria can be, but are not limited to, waveform conditions that produce good radar performance. The communications alphabet may be mapped by a computed mathematical bijection onto part of a standard/known communications technique that achieves close to the theoretical limit for throughput and SNR. The algorithm is discussed in detail in the incorporated academic paper.

FIG. 1 is a three-dimensional visualization of a multidimensional vector space where each point represents a waveform of fixed pulse duration (pulse time) and spectral concentration (bandwidth). A waveform 102 can be mathematically expressed as a point 101 that exists in multidimensional vector space 100. Multidimensional vector space 100 is a parameterization of all possible waveforms 102 having the fixed pulse duration (pulse time) and spectral concentration (bandwidth).

A waveform pulse 102 within vector space 100 is limited by bandwidth W and pulse-time, T, and has approximately K complex degrees of freedom, where K=WT. In a specific example, baseband waveform pulses s(t) with pulse time T and frequencies concentrated in the range $-W/2$ and $W/2$ can be mathematically approximated as the sum of K orthogonal bandwidth limited wave functions $\{\Phi_k\}$. These $\Phi_k$ are called prolate spheroidal wave functions, also known as Slepian Sequences.

$$s(t)=\Sigma_{k=1}^{K}s_k\Phi_k(t), s_k \in C \quad \text{Equation 1}$$

Using Equation 1, each such waveform s with its corresponding $s_k$ can be identified, and through this identification the waveform may be treated as a point in a standard Euclidean vector space:

$$s \in C^K \approx R^{2K} \quad \text{Equation 2}$$

where $C^K$ is a complex vector space of dimension K and $R^{2K}$ is a real vector space of dimension 2K. Real vector space $R^{2K}$ is notionally represented as three-dimensional by the multidimensional vector space 100 shown in FIG. 1.

A manifold 103 can be defined in multidimensional vector space 100 by inputting restrictions for waveform 102 similar to how the restriction $x^2+y^2+z^2=C$ defines a three-dimensional sphere in $R^3$. The manifold 103 and vector space 100 in FIG. 1 (and all drawings contained in this application) are for illustration only and manifolds, points, and planes utilized by the invention are multidimensional objects in vector spaces incapable of being perfectly represented by a two-dimensional drawing. The manifold 103 is not limited to a sphere or its higher dimensional equivalents but can have any manner of complex geometries. Manifold 103 can be considered a higher-dimensional analog to three dimensional surfaces. Importantly, manifold 103 can be parameterized locally with a smooth coordinate system. Points on (or inside) manifold 103 represent waveforms that meet or exceed constraint functions that define the inputted restrictions. If the constraint functions are requirements for good radar waveforms, points on (or inside) manifold 103 represent good radar transmit waveforms and points outside manifold 103 represent waveforms rejected as unsuitable for radar use. Constraint functions can be selected to define any desired waveform requirement/limitation based upon the needs of the system and user.

Mathematically, a set of L number of higher dimensional constraints can be generically expressed as the following:

$$F_l(s) \lessgtr c_l \text{ where } l=1,\ldots,L \quad \text{Equation 3}$$

$F_l$ are any real-valued differentiable function ("goodness metrics") and $c_l \in R$ are real constraints that specify the minimal or maximal acceptable value of the corresponding goodness metric $F_l$. In some embodiments $F_l$ and $c_l$ define radar performance specifications. $F_l$ may define the radar performance specifications that include but are not limited to maximum spectral leakage, quantities characterizing the optimal achievable responses of the waveforms to range-Doppler filters, or other restrictions required for good radar performance. $F_l$ may also define any desired waveform requirement/limitation based upon the needs of the system and user.

Using Equations 2 and 3, manifold 103 can defined as a set X of waveforms s that satisfy goodness metrics $F_l(s)$:

$$X \equiv \{s \in R^{2K}: F_l(s) \lessgtr c_l, l=1,\ldots,L\} \quad \text{Equation 4}$$

If, $F_l$ are radar performance specifications, each waveform in set X is a good radar waveform. Equation 4 has been mathematically shown to require that manifold 103 (X) be a submanifold of vector space 100 (real vector space $R^{2K}$) with dimensions $n \equiv 2K-L_{eq}$ where $L_{eq}$ is the number of strict equality constraints of $F_l(s)$. The elements manifold 103 and vector space 100 refer only to an illustrative example. The formulations and equations disclosed in this application are generalized for any manifold, vector space, waveform pulse, or other references variable.

If the waveform restrictions ($F_l$) that define manifold 103 are the specifications required for good radar signals then points, for example point 101, located on the manifold represent waveforms 102 that are suitable for use in radar.

However, standard/known communication schemes cannot be directly overlaid on the irregularly shaped manifolds, such as manifold 103 (X), created by restrictions required for good radar performance and/or other desired waveform restrictions. However, manifold 103 (X) can be parameterized with local smooth coordinate systems. These smooth coordinate systems can be chosen to be a convenient form to overlay a communication scheme on.

Figure 2:
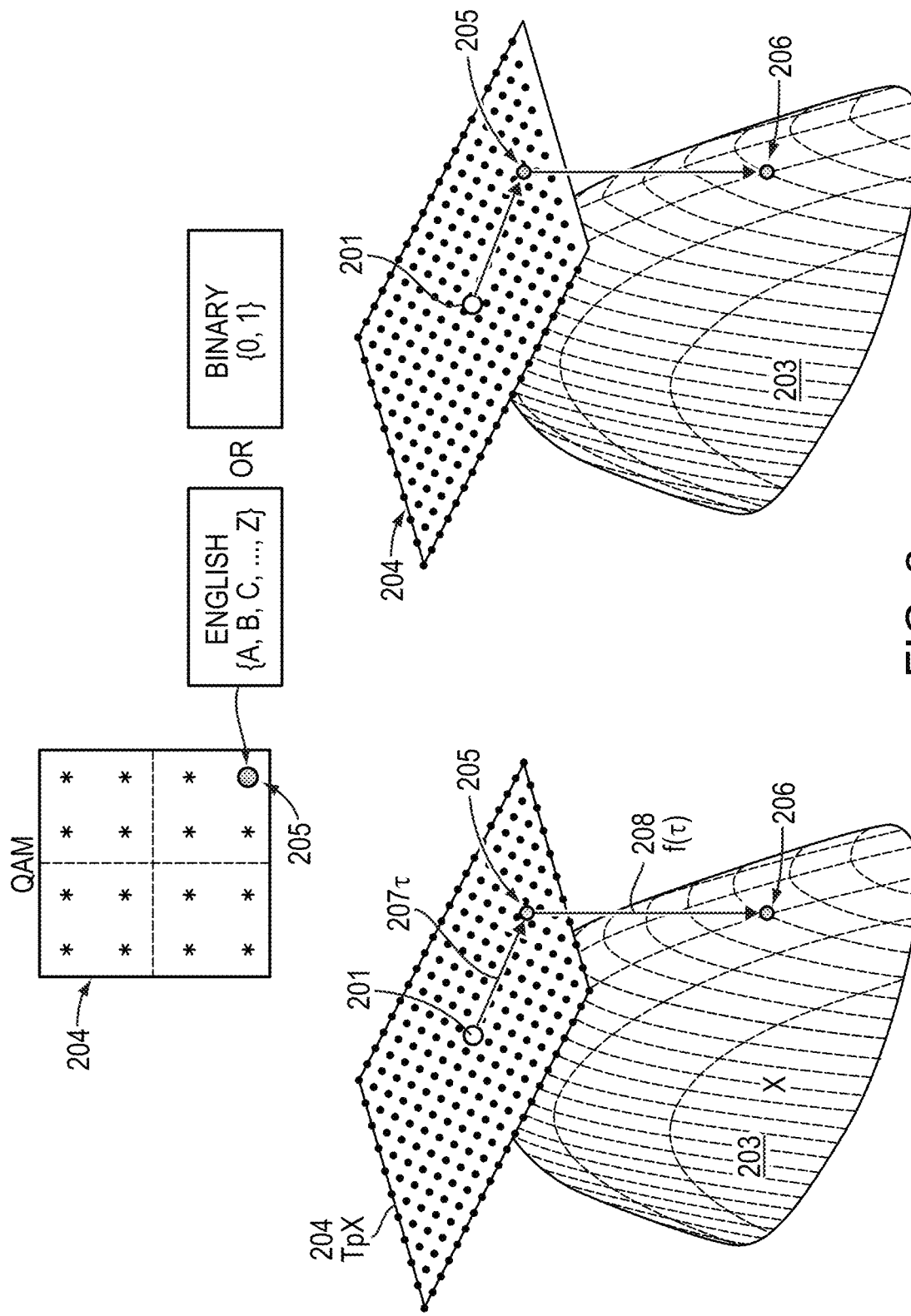
FIG. 2 is a three-dimensional visualization of a plane containing a set of points representing waveforms containing communication data and a manifold in a multidimensional vector space where each point represents a waveform of a fixed pulse duration and spectral concentration (bandwidth).

FIG. 2 is a three-dimensional visualization of a plane and manifold in vector space where each point represents a waveform of fixed pulse duration (pulse time) and spectral concentration (bandwidth). Point 201 located on the surface of manifold 203 is selected. In some embodiments, point 201 is selected based in part upon second order operations of the equations defining manifold 203. Alternative methods of determining point 201 can also be utilized. Point 201 represents an initial known-good waveform that satisfies the waveform restrictions that define manifold 203.

In a specific example embedment, point 201 p, is a point on manifold X 203, a submanifold of real vector space $R^{2K}$, with dimensions $n \equiv 2K - L_{eq}$. At point 201 p, there is an n dimensional tangent plane 204 $T_pX$ and a $L_{eq}$ dimensional normal plane $N_pX$. All points, e.g. point 206, of manifold X 203 close to point p 201 can be parameterized as the graph of a differentiable function $f(\tau)$ over $T_pX$, written mathematically as:

$$\{p+\tau+f(\tau): \tau \in U \subset T_pX\} \quad \text{Equation 5}$$

U is a neighborhood of tangent plane 204 $T_pX$ containing point 201 p and $f: U \to N_pX$ is a graphing function taking values in the normal plane at p, $N_pX$. Therefore, local to point 201 p, manifold X 203 can be viewed as a graph over tangent plane 204 $T_pX$. This property allows the use of existing capacity-approaching communication protocols for the standard Gaussian channel that achieve high throughput while only using the waveforms composing manifold X 203.

For some encoding strategies a more quantifiable expression of the plane 204 is needed. In such embodiments, a rectangular representation, R, can be can be defined. If $\tau 1, \tau 2, \ldots, \tau_n$ is an orthonormal basis of plane 204 ($T_pX$ in FIG. 2), and $\rho_1, \rho_2, \ldots, \rho_n$ are positive widths for those orthonormal basis chosen so that $f(\tau)$ remains well defined within the coordinate rectangle the rectangular representation is defined as follows:

$$R = \{\Sigma_i \alpha_i \tau_i : |\alpha_s| \leq \rho_i\} \subset U \quad \text{Equation 6}$$

Plane 204 or any sub-planes of plane 204 can be used as a communications plane, within which standard/known communication techniques can be performed. In some embodiments plane 204 is tangent to manifold 203. Plane 204 contains a set of points, for example point 205, that can be used to encode communication data. These points can be defined by Equation 6. The rectangular grid, R, is composed of points along the plane 204. In some embodiments, the points of rectangular gird, R, are evenly spaced. These set of points and the set of waveforms it represents can be used as "letters" that compose a communication alphabet or constellation that represent data. The communication alphabet can be mapped directly to $\tau \in U \subset T_pX$. In some embodiments, the communication alphabet is composed of discrete points, e.g. point 205, contained in plane 204 and is a structured alphabet of communications data indexed by patch number and grid coordinates. While FIG. 2 depicts an illustrative constraint manifold 203 and plane 204 of dimension 2, this method is generalizable to any desired dimensionality. The size of the alphabet or constellation (number of discrete points) determines the density of grid points. Finer grids facilitate higher channel throughput, but require sufficiently higher SNR to decode with negligible bit error rate. The patch number and grid coordinates may be coded on analogously to how a quadrature amplitude modulation (QAM) constellation may be coded on in a standard Gaussian communications channel. Alternative communication standards and encoding methods may also be adopted to work with the embodiments of the invention.

The set of points located on plane 204 are not located on manifold 203. Therefore, the waveforms represented by points 205 do not satisfy the restrictions that define manifold 203. A correction factor needs to be added to point 205 to transform it into point 206, which is located on manifold 203 and therefore satisfies the inputted waveform requirements. Similarly, all points in the communications alphabet in plane 204 can be projected to points on manifold 203 that satisfy the inputted waveform constraints creating a communication alphabet that also satisfies the imposed constraint functions. This process can be described as correcting the communications alphabet to produce a waveform-coded alphabet or constellation. However, this transformation must be accomplished without disrupting the communications alphabet defined by the points contained in plane 204.

Communication data can be encoded in the tangent coordinates $\tau \in U \subset T_pX$, relative to manifold 203, used to represent a point $p+\tau+f(\tau)$, such as point 206, on manifold 203 defined in Equation 5. If the communications alphabet is defined only using the dimension that compose tangent plane 204, the communications alphabet is unaffected by the addition of a correction factor that is normal to plane 204. The correction factor would be composed of the normal component $f(\tau)$ 208. By determining the point of intersection of a normal line to plane 204 point 205 and manifold 203 point 206 can be identified and normal component $f(\tau)$ 208 calculated. Point 206 is located on manifold 203 and therefore satisfies the inputted waveform restrictions and point 206 has the same tangent coordinates (relative to point p) as point 205 and therefore represents the same data or "letter" in the communications alphabet as point 205. The waveform that point 206 represents can act as both a waveform that satisfies restrictive conditions, such as those needed for good radar performance, and be a "letter" in a communications alphabet.

The full waveform-coded alphabet is obtained from the $\tau$ 207 components that are used to compose the uncorrected communication alphabet or constellation that represents communication data with an added normal component $f(\tau)$ 208 correction. This bijection permits efficient channel coding, for example, with a binary Turbo code and Grey code mapped onto a communications grid via bit interleaving.

In contrast to coding for the standard Gaussian channel, a communications alphabet mapped directly to $\tau \in U \subset T_pX$ does not relate in any direct way to the energy of the corresponding transmitted waveform. Instead it is simply a measure of tangential distance $\tau$ 207 to a selected base point p 201. When manifold 203 X is bounded, the optimal high-SNR communications data coding strategy has an approximately uniform distribution on manifold 203 X with respect to Euclidean volume measuring. Therefore, pulse-shaping techniques for the standard Gaussian channel are unnecessary. This method can encode communication data into waveforms evenly over the applicable local region of the constraint manifold 203.

In general, manifold 203 cannot be fully parameterized in any single coordinate system. In some embodiments, the constraint manifold may be more fully mapped as a disjoint union of M≥1 local coordinate patches. Additional communication throughput may be realized using a multilevel encoding scheme with the choice of coordinate patch encoding additional data. An example two-level encoding scheme may be implemented in the following manner: for the first level, one of the M patches is chosen encoding at most loge M bits per waveform transmitted. At the second level, the remainder of the data is encoded within the chosen coordinate patch. In a high-SNR situation, the inter-coordinate-patch encoding can account for the bulk of the throughput. While the descriptions herein focus on a single-patch embodiment, they can be generalized to apply to a multi-patch embodiment as well.

The calculation of manifold 203, plane 204, points 201 and 205 may be performed by a backend computer or similar electronic device. The backend computer may further carry out all required calculations needed to define the communications alphabet in plane 204 including but not limited to the construction and solving of Equations 1-6. The identification of point 206 and the addition of the correction $f(\tau)$ 208 along the normal vector used to transform point 205 to 206 and construct the waveform-coded alphabet may be performed at an encoder before the transmittal of a waveform.

Figure 3:
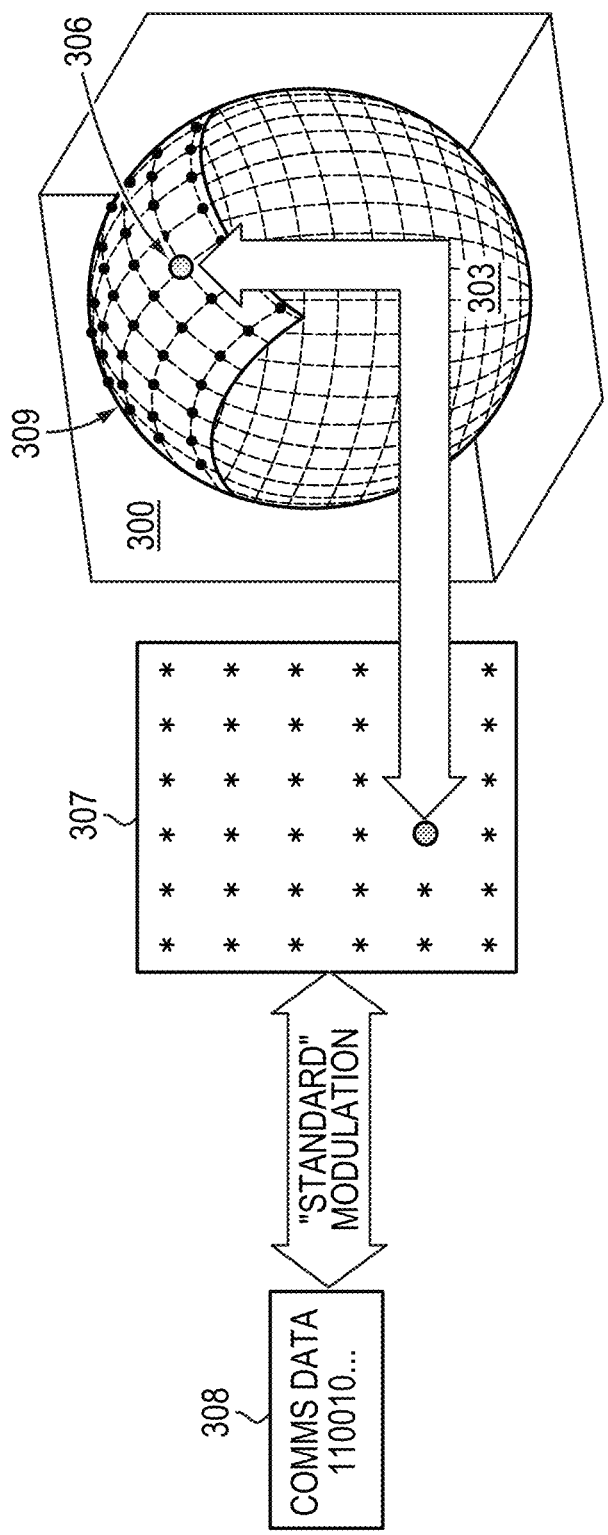
FIG. 3 is a three-dimensional visualization of a mapping a communication alphabet to points on a manifold in a multidimensional vector space where each point represents a waveform of a fixed pulse duration and spectral concentration (bandwidth).

FIG. 3 is a three-dimensional visualization of mapping a communication alphabet 307 to points on a manifold 303 in a multidimensional vector space 300 where each point 306 represents a waveform of fixed pulse duration (pulse time) and spectral concentration (bandwidth). The process described above for points 205 and 206 can be performed for each "letter" of the communications alphabet. Each point 306 on the two-dimensional plane 307 onto which communications data 308 is encoded can be transformed a corresponding point on surface 309 located on manifold 303. All points on communications pane 307 can be projected onto surface 309 without interfering with their mapping to the communications data 308. The encoded communications data 308 is unaffected by this transformation because the transformation is performed by adding a correction to the vector(s) normal to plane 307. Each point on surface 309 represents a waveform that is both a "letter" of a communications alphabet encoded with communications data 308 and a waveform that satisfies the inputted waveform restrictions that define manifold 303. The waveform-coded alphabet composed of points contained on surface 309 can be used to encode, in real time, binary communications data into waveforms that satisfy the inputted waveform restrictions that define manifold 303. The real time encoding may be performed by a dedicated encoder device that computes the $f(\tau)$ correction for each point on the two-dimensional plane 307 required to project it onto surface 309 of manifold 303. Alternatively, the calculation of surface 309 and the waveform-coded alphabet may be performed by the same backend computer that defines the communications alphabet 307 and manifold 303. The encoded communications data can be transmitted at throughputs and at medium-to-high-SNR using only waveforms that satisfy the inputted waveform constraints.

A transmitter can transmit waveforms that satisfy the signal constraints, such as constraints required for good radar waveforms that also include encoded communication data. The transmitter may be a standard radar transmitter coupled to an encoder and/or other elements of the invention used to encode communications data into waveforms that satisfy constraints. The transmitter may also be a sonar or other ranging system transmitter and the signal constraints can be selected to limit the emitted signals to good sonar waveforms or the equivalent signals of other ranging systems. The transmitter may be a bistatic radar or monostatic radar with appropriate simultaneous transmit and receive (STAR) technology.

A communications receiver can receive the transmitted signals and decode the communications data by reversing the process described above. The communications receiver has knowledge of the constraint manifold 303, its local coordinate patch(es), and the encoding scheme and alphabet. More specifically in some embodiments, the decoder first computes the received signal components in $R^{2K}$ as real and imaginary part of the inner products $\langle \Phi_k(t), r(t) \rangle$ where r(t) is a received pulse after synchronization. The receiver then subtracts the base waveform of point p 201. The receiver then determines $\alpha_i$, as inner products with $\tau_i$. As shown in Equation 6, $\alpha_i$ are coordinate values for the tangent plane coordinate rectangle where the communications alphabet is encoded. The resulting $\alpha_i$ values are then processed with a standard communications decoder. In other words, the decoder normalizes and orthogonally projects a received signal onto $T_pX$. Once projected onto $T_pX$ the received signal can be mapped to the grid coordinates representing the communications alphabet and encoded communication data interpreted. In some embodiments, the simple orthogonal projection used to estimate the $\alpha_i$ is replaced with a set of filters designed to mitigate interference due to multipath effects.

In some embodiments, the transmitter, prior to transmitting the waveform(s) with communications data, transmits one or more synchronization pulses. These synchronization pulses can be known to the receiver and used to signal the initiation of the transmittal of communications data. The synchronization pulses along with other preliminary signal processing provides an energy-normalized direct-path noisy copy of the transmitted waveform is available to the receiver. The resulting channel noise may be modeled as additive white Gaussian noise (AWGN). The received signal projected onto $T_pX$ will retain the AWGN noise statistics which can be dealt with using standard processing techniques such as a Viterbi decoder.

To improve the encoding of communications data in a manifold patch local to a point p, the valid extents of $\rho_i$, and the tangent coordinate directions, can be determined. Depending on the underlying local shape of the manifold, some tangent directions remain valid over longer distances than others. Moreover, the total volume of the tangent plane available for coding communication data (determined by the product of the $\rho_i$) will depend on the choice of the $\tau_i$ coordinate basis vectors. Given that point $p \in$ manifold X, an optimal set of $\tau_i$ coordinate basis vectors and their corresponding $\rho_i$, the tangent coordinate directions can be computed to optimize communications data encoding.

The high dimensionality of manifold X is a significant numerical impediment to these calculations. The number of manifold dimension is related to bandwidth, pulse time, and number of constraint equations: $n \approx 2WT - L_{eq}$; For radar waveforms, n can be several hundred or larger. While a brute force approach can be utilized, the calculations required grow exponentially when the dimension of the manifold X are increased. One possible alternative approach is to use estimates based on local geometric quantities computed at point p, obtained from the second derivative of the graphing function $f(\tau)$. However, any desired mathematical technique can be used to determine a manifold patch local to a point p, the valid extents of $\rho_i$, and the tangent coordinate directions as well as select what point(s) on the constraint manifold to serve as base point(s) p.

To extract useful geometric information, it is helpful to focus on the level sets of the constraint functions, the (2K−L) dimensional manifolds over which the $F_l$ are constant. In the following example derivation, the subsequent is taken as given: waveform constraint functions $F_l$ and constraints $\gamma_l$ define a constraint manifold $X=\{y \in \mathbb{R}^{2K}:F_l(y)=y_l, l=1, \ldots, L\}$ and point $p \in X$. The following example derivation can be performed with a standard computer or equivalent. Said computer may also be used for any other step or element of the invented method disclosed herein. Equivalent derivations, equations and/or algorithms, known to those skilled in the art, to the following example, can also be utilized with the method described herein. Specific techniques can be selected based on the needs of the system and user such as optimizing computational resources and throughput.

Computing tangent plane $T_pX$ and normal plane $N_pX$: The gradient vectors $\nabla F_l(p)$ (l=1, ..., L) may be estimated using nL numerical derivatives and together constitute a (not necessarily orthonormal) basis of $N_pX$. By forming an L×2K matrix M using the gradients as rows, the nullspace of M consists of vectors orthogonal to $N_pX$. In MATLAB, U=null (M) yields a 2K−L×2K matrix whose columns form an orthonormal basis of $T_pX$.

Computing $f(\tau)$: Given $\tau \in T_pX$, $f(\tau)$ is defined as the vector $N_pX$ such that $F_l(p+\tau+f(\tau))=F_l(p)$ for all l. This can be computed with an L-dimensional root-finding routine on a bounded domain. If the routine fails, $\tau$ lies outside the domain of definition for $f$.

To maximize the efficiency of encoding the communications data, it is helpful to separate "good" tangent directions (for which the parameterization holds over significant distances) from "bad" directions (where the parameterization fails quickly). Particularly bad tangent directions can be effectively treated as normal instead and not utilized.

Using second-order difference quotients at p along an orthonormal basis of $T_pX$, the second derivatives of the local graph function $f$ can be numerically estimated. For each gradient normal direction, $f$ has a real $2K-L_{eq} \times 2K-L_{eq}$ square symmetric Hessian matric $D^2f_l$ that can be diagonalized in an orthonormal eigenbasis of tangent vectors. The sign and magnitude of the corresponding eigenvalues of the eigenbasis encode local geometric information. Along tangent directions corresponding to large positive eigenvalues, the boundary of the constraint manifold coils tightly around its interior, restricting the tangent parameterization significantly. Conversely, negative eigenvalues correspond to excellent tangent directions; for tangent directions corresponding to large negative eigenvalues the local boundary is curling away from the interior. Along directions of small absolute value eigenvalues, the boundary of the manifold is roughly horizontal to the tangent and thus, also amenable to an extended parameterization.

Figure 4:
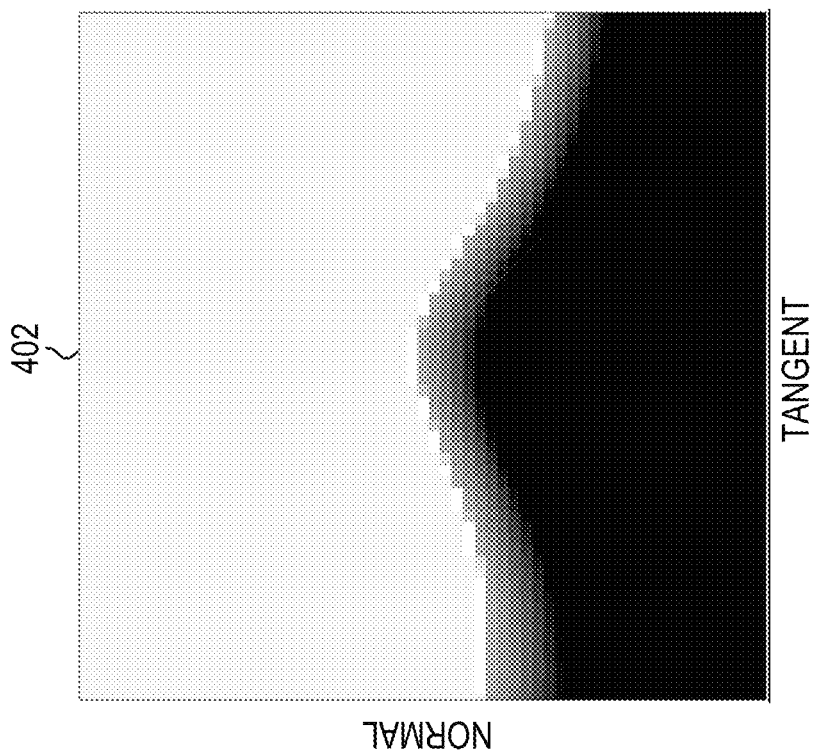
FIG. 4 is a set of graphs of the positive and negative-eigenvalue directions of second order manifold boundaries.
Figure 4:
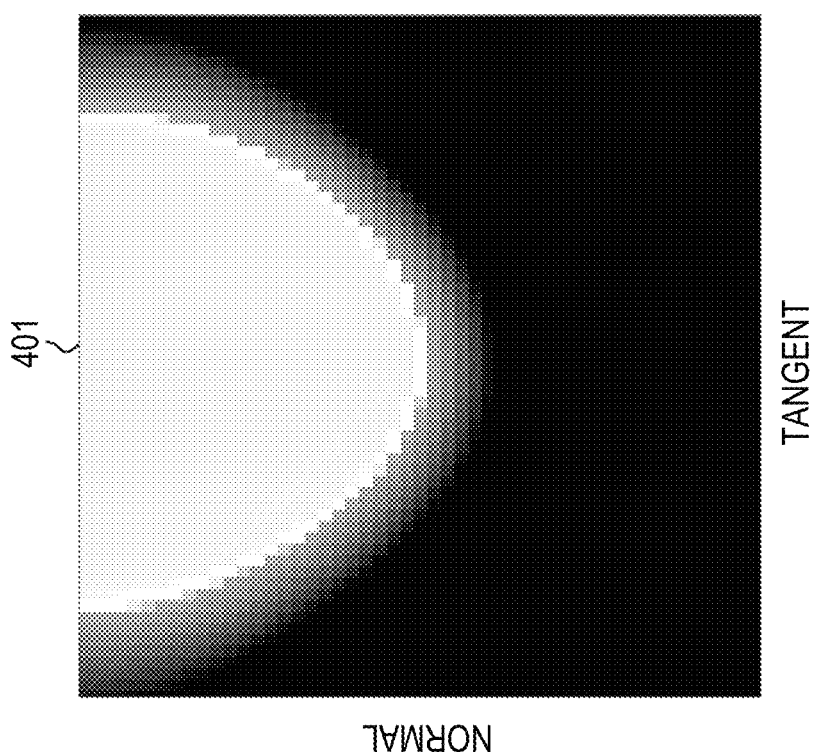

FIG. 4 is a set of graphs showing positive and negative eigenvalue directions of second order manifold boundaries. Graph 401 shows a positive eigenvalue direction of a second-order manifold boundary and Graph 402 shows a negative eigenvalue direction of a second-order manifold boundary.

Finding good $\tau_i$ and estimating $\rho_i$ for a choice of l: Using second-order difference quotients, numerically estimate the Hessian matrix $H=D^2f_l(p)$ in the basis given by the columns of U. The eigenvectors and eigenvalues can be computed in MATLAB, [V,D]=eig(H). Then $\tau_i$ is the ith column of U*V. The corresponding $\rho_i^{-1} \cong \max(\lambda_i, 0)$, where $\lambda_i$ are the eigenvalues of the diagonal D. The $\tau_i$ with excessively-small $\rho_i$ can be discarded.

The example method above provides excellent geometric guidance but cannot solely guarantee that all $\tau \in R$ have a well-defined $f(\tau)$. However, a statistical approach may be used to increase the chance that the chosen $\tau \in R$ have a well-defined $f(\tau)$. By verifying the feasibility of a significant random sample, and shrinking $\rho_i$ if necessary, until problematic points become vanishingly rare. If an exceptional (problematic) point still happens and is used during encoding, it can be substituted with a F-optimizing choice of $v \in N_pX$ as a fallback, even if the resulting waveform fails to properly satisfy the constraints. This would permit communication transmission to proceed without altering the decoder's process. Alternatively, if the optimally-determined choice v is found to be too poor for radar use, a standard good radar waveform may be substituted in its place, triggering a decoding error for the current communication packet and contributing to the overall bit error rate.

To further maximize communication data throughput, a point p can be selected that enables the local manifold patch, used to encode the communications data, to be as large as possible. The second-order information discussed previously indicates that it is optimal to seek mostly negative or small positive eigenvalues for the $D^2f_l$ matrix. Thus, the local patch R can be chosen by an initial numerical optimization on eigenvalues. As a computationally simpler proxy only the trace of the $D^2f_l$ matrix can be computed, requiring fewer numerical derivatives.

Optimal Coordinate Patch: A random point $y \in \mathbb{R}^{2K}$ can be chosen, if y fails to satisfy the constraint functions $F_l$ a numerical gradient descent is performed until $y' \in X$. The diagonal elements of the Hessian H are computed and summed yielding the trace. This process is repeated for a large number of randomly-chosen starting points y. The y' with the smallest computed trace is selected to be used as p. If additional candidate patches are desired, patch selection can be iterated.

Example Radar Performance Constraints

To implement the radar based embodiments of the invention, what constitutes a "good" radar waveform needs to be concretely defined. One key impediment to good pulse-Doppler radar performance is range sidelobe modulation. In traditional pulse-Doppler radar identical waveform pulses are used which allows the pulse responses to also be identical and the Doppler filter to remain coherent across the range bins. However, when waveform diversity is increased, the pulse responses are different for each waveform pulse and the Doppler filter is non-coherent across over range sidelobes. Waveform pulses with lower average range sidelobes decrease range sidelobe modulation. Therefore, constraint functions that require each waveform to admit a pulse-compression filter that simultaneously achieves low average integrated sidelobes and a small filter loss would lead to signals better suited for radar performance. Constraint functions can also be selected to require other quantities characterizing the optimal achievable responses of the waveforms to range-Doppler filters. Other range finding systems may require waveform pulses limited by similar or additional variables and filter responses. The waveform limitations desired, and the constraint functions utilized, can be tailored to the individual needs of a specific system and/or user.

A set of constraint functions $F_l$ and reasonable corresponding cutoff values $c_l$ as per Equation 3 need to be selected. A person skilled in the art would understand than all sets of constraint functions described in this Application are merely example embodiments and that the method and systems set out herein can be generalized to work with any chosen set of constraint functions. In the current example, the constraint functions will require waveforms which admit a pulse-compression filter that simultaneously achieves low average integrated sidelobes and small filter loss. For a give waveform s, the filter-loss-to-average-sidelobe-ratio (FLSLR) is minimized by the filter w∝R$^{-1}$s where R is the sidelobe cross-correlation matrix. It is proven that diagonal loading of R achieves an optimal trade-off between sidelobe suppression and filter gain. By monotonically increasing diagonal loading until the desired filter loss is achieved, we can efficiently compute the best FLSLR achievable for a given waveform s is a filter loss $\alpha \leq 1$ (e.g. $\alpha = -a$ dB). This optimal FLSLR can be used as the constraint function $F_1$. Thus, $c_1$ corresponds to the lowest FLSLR acceptable for effective signal processing of the radar returns. $F_1$ can be efficiently computed with covariance-inversion techniques.

The FLSLR constraint function $F_1$ is independent of overall scale factor. Therefore, constraint factor $F_2 \equiv \|s\| = c_2 \equiv 1$ can be added as an additional requirement. This corresponds to radar waveforms of a fixed energy per pulse. The value of the fixed pulse energy can be chosen to be as large as possible subject to hardware constraints. Other constraint choices are also possible either alone or in combination with the constraint functions described herein, for example requiring a level of Doppler tolerance or fixed energy constraint.

Simulated Example

A simulated example illustrating the capabilities of the invention using a single coordinate patch methodology and a time-bandwidth product of K=WT=20 and the set of constraint functions $F_1$ and $F_2$ is as follows. The radar waveforms are constrained to admit a pulse-compression filter with no more than −1 dB filter response/loss and average sidelobes that are comparable to those of an equivalent Linear Frequency Modulated (LFM) signal with matched filter. Linear Frequency Modulated (LFM) signals without communications data encoded are commonly used for many current radar applications.

Figure 5:
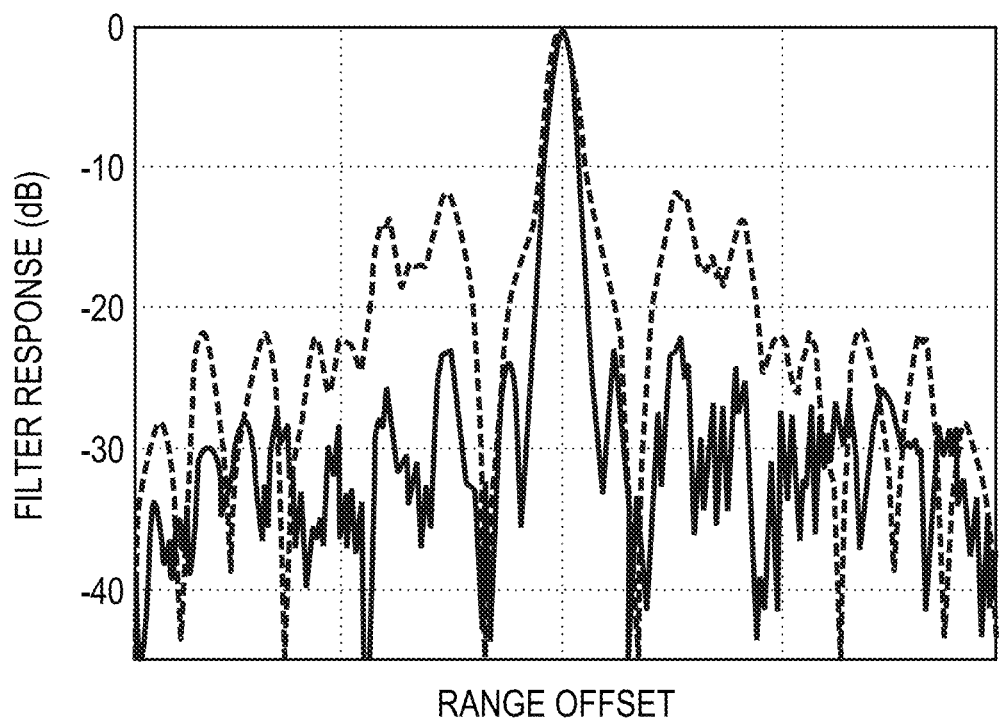
FIG. 5 is a graph of pulse compression filter responses at time-bandwidth product WT=20 for a randomly generated "good" waveform.

FIG. 5 is a graph of pulse compression filter responses at WT=20 for a randomly generated "good" waveform. A waveform was generated using a random combination of prolate spheroidal wave functions with K=WT=20. A pulse compression filter was found which achieved sidelobe levels comparable to a matched-filtered LFM, with a filter loss of −1 dB. In FIG. 5 the dotted line shows the matched-filter pulse compression response of a nonstandard radar waveform, which exhibits undesirably high sidelobes of −15 dB or greater for some range offsets. In FIG. 5 the solid line shows response for a waveform constrained with the discovered pulse compression filter. Range sidelobes are 10-15 dB lower than the dotted line, a substantial improvement.

Using the known-good waveform as the point p, the eigenvectors of the Hessian were calculated. The top two eigenvectors were discarded and a coordinate patch surrounding point p was defined with $\rho \geq 0.56$ over 36 real tangent directions and an effective encoding power of −5 dB relative to transmit waveform power.

Encoding was performed on points within the patch with a binary Turbo code and bit-interleaving onto a rectangular grid with k points per 2 real dimensions. In this realization, $T_p X$ is a product space of $\mathbb{C}^{18}$. The block size of the alphabet was chosen to correspond to a train of 120 radar transmit pulses (2160 k-QAM symbols).

Figure 6:
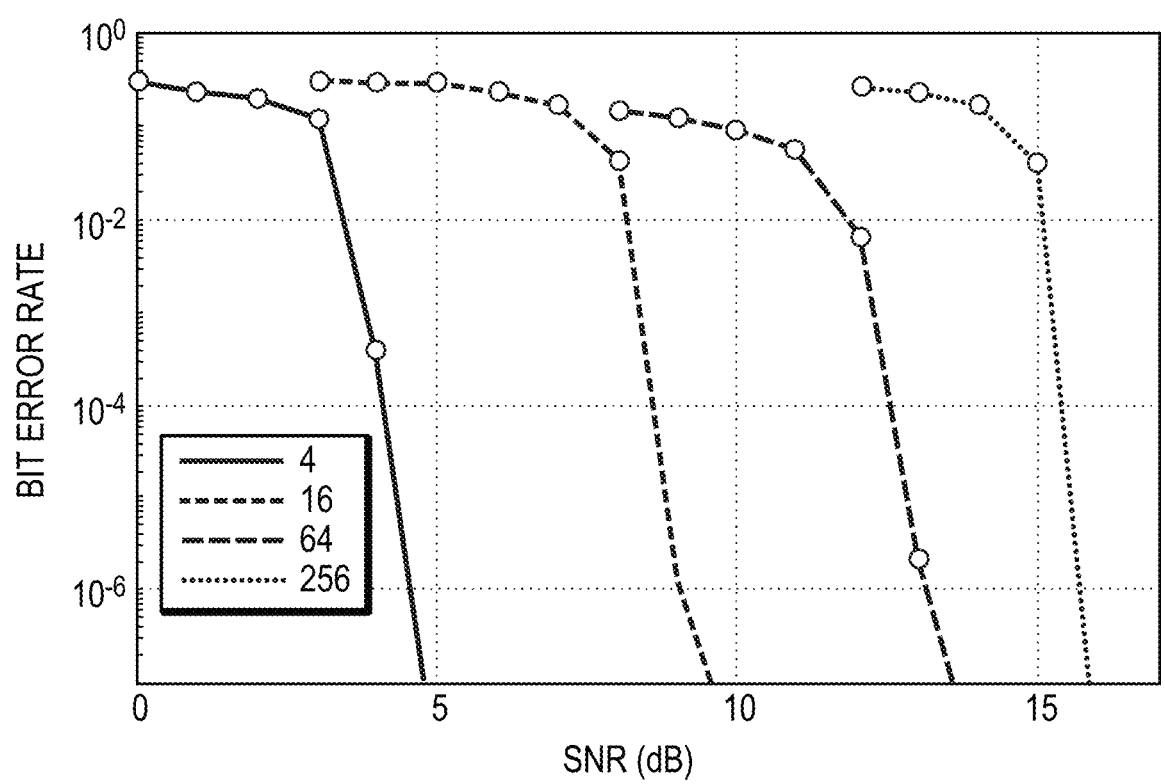
FIG. 6 plots bit to bit error rates for k=4, 16, 64, 256 in a simulated example embodiment.

FIG. 6 plots bit to bit error rates for k=4, 16, 64, 256. Generally, bit error rates of less than $10^{-6}$ are desirable for codes. FIG. 6 illustrates the SNRs required for viable coders for each k.

Figure 7:
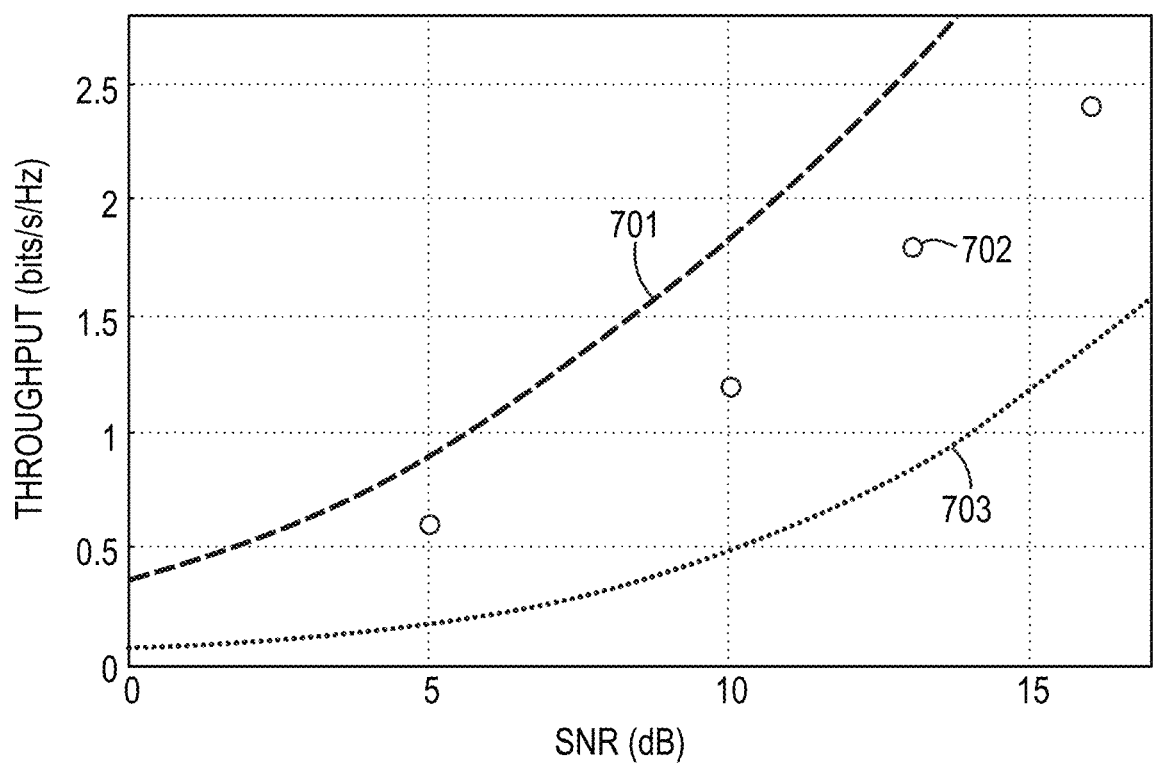
FIG. 7 plots the simulated communication throughput of a single-patch alphabet embodiment of the invention compared to a prior art additive communications technique.

FIG. 7 plots the simulated communication throughput of a single-patch alphabet embodiment of the invention compared to a prior art additive communications technique. Line 701 is the channel capacity of a single-patch alphabet embodiment of the current invention estimated using the Shannon-Hartley theorem. Points 702 are throughputs calculated in the simulated example of WT=20. Line 703 is the prior art "basic perturbative" technique that adds low-power communication signals to standard radar waveforms estimated using the Shannon-Hartley theorem. In the relevant range of SNRs the invention's technique achieves approximately double the maximum possible throughputs of the prior art technique. Communication alphabets composed of "good" radar waveforms could be capable of high-SNR throughputs on par with an unconstrained (communication only) channel. Note that the SNR requirements are consistent with the application: radar signals generally have high SNRs in a one-way application, such as communications.

Figure 8:
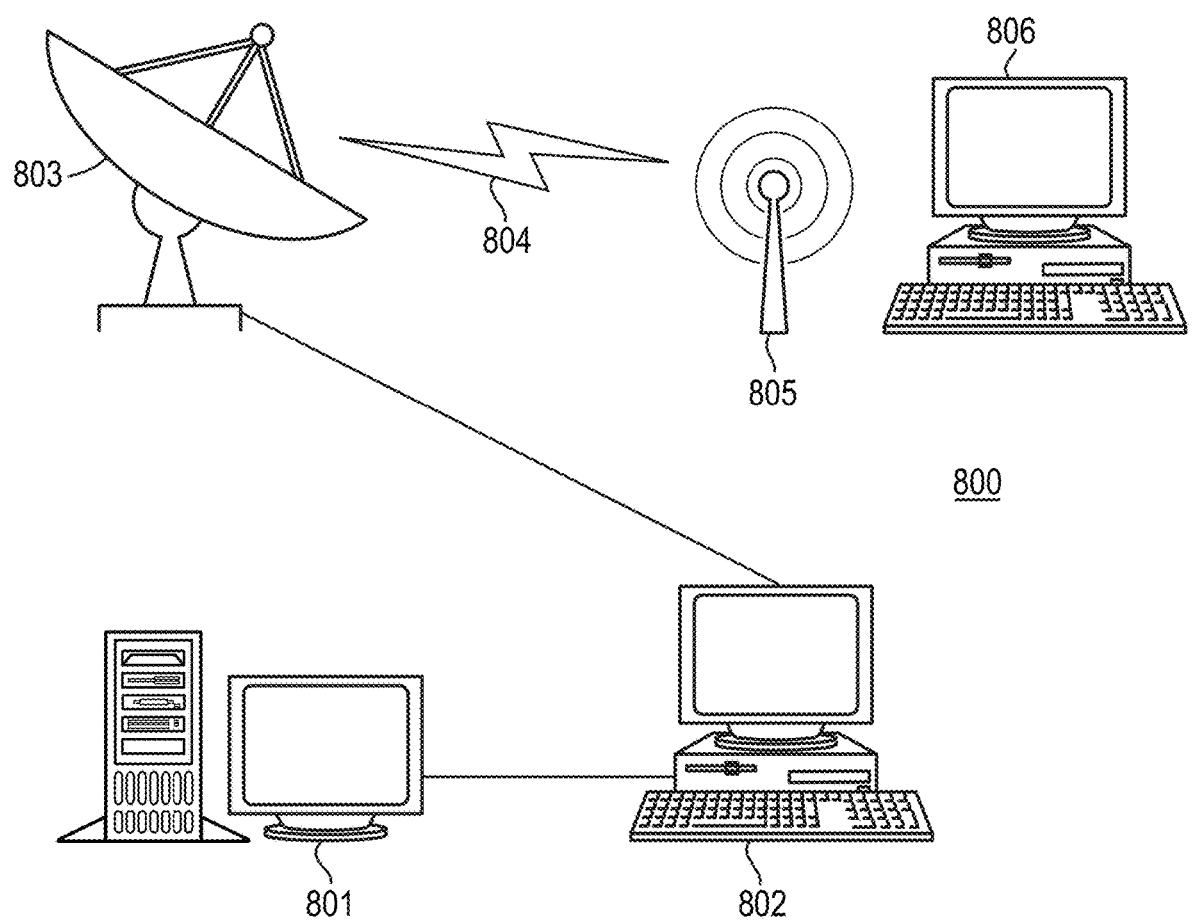
FIG. 8 is a system for sending and receiving high-throughput wireless communications encoded using radar waveforms, in an example embodiment of the invention.

FIG. 8 is a system 800 for sending and receiving high-throughput wireless communications encoded using radar waveforms, in an example embodiment of the invention. System 800 includes a backend computer 801, an encoder 802, a transmitter 803, a receiver 805 and a decoder 806. System 800 allows for radar, or similar range finding techniques, to share signals and spectrums with communication transmissions. System 800 provides unified hardware for both radar signals and communications signals and allows for novel radar modalities. System 800 provides the benefits of unified hardware without the suboptimal performance trade-offs required by existing methods and systems.

System 800 is configured to produce communication signals 804 that also satisfy inputted constraint functions. In some embodiments, the inputted constraint functions defined are quantities characterizing the optimal achievable responses of the waveforms to range and/or Doppler filters and/or a computationally-desirable subset range and/or Doppler filters. System 800 is capable of producing signals with LFM-like range sidelobes, incurring less than 1 dB additional filter loss, and high-SNR throughput comparable to standard communication methods that can be used as both communication signals and radar, or a similar range finding technique's, signals. System 800 is capable of utilizing any set of constraint functions to produce communication waveforms that also satisfy desired waveform limitations or have desired parameters. Furthermore, System 800 does not require an unreasonable computational load to perform the methods described herein.

Backend computer 801 performs the necessary calculations to identify, quantify and create the waveform coded communication alphabet. In some embodiments the calculations performed by backend computer 801 can be performed prior to any encoding or signal transmission. Furthermore, the results of the backend computer 801 can be used by multiple copies of the encoder, transmitter, receiver, and/or decoder. The waveform coded communication alphabet is contained in a local patch surrounding a point on a manifold defined by constraint functions. In multi-patch embodiments, backend computer 801 is configured to determine multiple local patches containing waveform coded communication alphabets. If the constraint functions define "good" radar waveforms than all waveforms represented by the points in the waveform coded communication alphabet are can be used as radar signals. Encoder 802 uses the waveform coded communication alphabet to encode communication data into signals 804. Encoder 802 may be part of or the same as back end computer 801. Alternatively, encoder 802 may be separate from Backend computer 801.

The calculations required to encode communication data into signals 804 that satisfy inputted constraint functions can performed by either backend computer 801 or encoder 802. In certain embodiments, backend computer 801 and/or encoder 802 can be configured to perform any combination of the required steps or calculations.

Transmitter 803 receives the encoded signal 804 from encoder 802 and transmits it. Signal 804 has encoded communication data but also is part of the manifold defined by the constraint functions. Signal 804 may be a radar signal that also carries communication data. Transmitter 803 may be a radar transmitter that can also send communication signals. Alternatively, transmitter 803 may primarily send communication signals but can send communication signals that are also used for radar. Transmitter 803 may also act as a radar receiver for reflected waveform pulses. Alternatively, a separate radar receiver can by utilized by system 800.

Receiver 805 receives signal 804. Receiver 805 can be any device capable of receiving transmitted communication signals. Transmitter 803 may send a synchronization signal to receiver 804 in order to initiate the interactions. Decoder 806, connected to receiver 805, analyzes received signal 804 and decodes the communication data contained within.

Field Test

A cluster suppression field test was performed that shows the benefits of the cooperative spectrum-sharing technique that utilizes dual-use waveforms suitable simultaneously for effective radar detection and transmission of communications data. In the test, a user specified one or more constraint functions which, when satisfied, determine a "good" radar waveform. Waveforms that satisfy the constraints were used to construct a waveform alphabet which was then modulated to encode and transmit information. The applicable waveform constraints are generalizable, providing flexibility for a user to tailor a waveform alphabet to the needs of the radar. The resulting waveform alphabet has a mathematical structure that is amenable to existing capacity-approaching coding techniques such as Turbo codes and low density parity check codes.

In the cluster suppression field test two constraint functions $F_1$, $F_2$ and corresponding cutoff values, $c_1$, $c_2$ were selected. $F_1$ is the filter-loss-to-average-sidelobe-ratio (FLSLR) minimized by the filter $w \propto R^{-1}s$ where R is the sidelobe cross-correlation matrix with diagonal-loading added, if necessary, to limit the filter loss of w to −1 dB. Thus, $c_1$ corresponds to the lowest FLSLR acceptable for effective signal processing of the radar returns. $F_2$ requires the radar transmit waveforms of a fixed energy per pulse. The fixed energy $c_2$ was chosen to be as large as possible subject to amplifier hardware constraints.

The cluster suppression test was performed using the single coordinate patch methodology and a time-bandwidth product of WT=43. The radar waveforms were restricted to admit a pulse-compression filter with no more than −1 dB filter loss and average sidelobes comparable to those of an LFM with matched-filter (about −37 dB). The cluster suppression test utilized two different methodologies for waveform calculation.

Using a variable-modulus (VM) methodology based on waveforms estimated as linear combinations of Slepian sequences shown in Equation 1, a valid local coordinate patch with a value of $\rho=0.5$ was defined after discarding the normal directions correspond to the constraint function gradients and the top 26 eigenvectors of the Hessian. The local coordinate patch yielded 2*(43−(2+26))=58 real orthonormal tangent directions and an effective coding power of −6 dB relative to transmit waveform power.

4520 bits were encoded into a pulse train of radar waveforms. The raw binary data was encoded with forward error-correction using default Turbo code, producing 2*(3*(4520+12)=13572 coded bits. Bit-interleaving covered the coded bits into a set of 3393 symbols from a standard complex 16-QAM constellation, representing 2 bits per real coding dimensions. The symbols were mapped onto 29 pairs of orthonormal constraint manifold tangent directions 117 times resulting in 117 waveforms. For each of the waveforms, the two normal directions were computed that resulted in a paired waveform with the same orthonormal constraint manifold tangent direction values that also satisfied the constraint equations. Finally, a train of 120 pulses were constructed using the paired waveforms and a predetermined synchronization waveform for pulses 1, 119, and 120. The synchronization waveform was selected to be waveform corresponding to base waveform $s_b$ at the center of the coordinate patch. Waveform pulses 2-118 contained the encoded data in the paired "good radar waveforms" that satisfied the constraint equations.

A generalized "submanifold" alternate approach is one way to handle numerically-challenging restrictions, such as the requirement of constant modulus (constant amplitude, "CM") waveforms. The problem that the general method previously described has is that constant modulus is heuristically equivalent to half the degrees of freedom, i.e. half the total time-bandwidth product TW are restricted by constraint equalities. Its numerical routines are built around a small number of constraint equalities/inequalities, and the computational complexity of the approach becomes more severe in the constant modulus case.

However, the constant modulus constraint does not need to be enforced numerically—parameterizing constant amplitude waveforms in terms of a series of phase offsets over time is well known in the art (among other approaches). A set of "good waveforms" in this case can be viewed as follows: within the 2TW-dimensional real vector space of time and band-limited waveforms, there is a manifold M of real dimension TW which corresponds to constant-modulus waveforms. This manifold M can also be parameterized. Within the constant-modulus manifold M, the additional inputted constraints are imposed. This imposition defines a submanifold X of the constant-modulus manifold M, which contains just the waveforms that satisfy the waveform constraints. Points on X still have tangent and normal spaces, which are considered relative to the constant-modulus manifold M, not ambient Euclidean space. Instead of coding communications data along a flat Euclidean tangent plane, the communication data is encoded along the coordinate axes of the phase parameterization of M, and only in directions tangent to X at the base point. This gives a tangent-coded waveform of constant modulus, but it may not still satisfy the added numerically-defined constraint functions, so the "correction" procedure is still applied, but only using normal directions are along M.

To decode communication data in the constant modulus situation, it requires two steps: first, estimate a constant-modulus waveform from the received signal using a maximum likelihood estimator or a similar appropriate estimator. Then, by mapping the estimated constant-modulus waveform into the phase parameter space, variations on standard communications decoders can be used to finish the decoding in the same manner as the variable modulus case. In this embodiment, the encoding no longer takes place on a flat Euclidean tangent surface, so the effective noise will (slightly) vary based on chosen constellation point. This approach may also be used to simplify any other desirable, but numerically-challenging, constraints which are amenable to explicit parameterization as a manifold M.

This alternative embodiment, utilizing constant-modulus (CM) pulses was also included in the field test. This CM pulse method uses the same general approach of mapping a constraint manifold and coding on tangent vectors, but in place of linear combinations of Slepian sequences the initial ambient spaces of waveforms are inherently constant modulus. To define the aforementioned manifold M, the following CM parameterization, a variant of the commonly-known frequency modulation technique was used:

$$s(t) = A * \exp\left(i\pi \sum_{k=1}^{[WT]} s_k \int_0^t 1_{[0,W^{-1}]}\left(t' - \frac{k-1}{W}\right)dt'\right) \quad \text{Equation 7}$$

In Equation 7, A is the desired overall scale factor and the function $1_{[0,W^{-1}]}$ takes the value 1 on the interval $[0,W^{-1}]$ and is zero elsewhere. The $s_k \in \mathbb{R}$, traditionally discretized and used to directly encode FM data as chips, are instead used as the variables that parameterize an ambient space of CM waveforms and are directly analogous to the coefficients of the Slepian sequences in the variable-modulus case. The waveform mapping and encoding proceeds identically to the Slepian sequence based variable-modulus case described previously. In the CM case, the tangent and normal directions of the constraint manifold are computed in terms of the $s_k$ parameters and thus, encoded waveforms always remain constant modulus automatically.

In the CM case, data was encoded using largely the same process as the variable-modulus. The phase coordinates $s_k$ of the base waveform were chosen to result in a base waveform that is approximately a standard LFM. The coordinate patch included all 42 real orthonormal tangent directions and 3300 bits of randomly generated data were encoded at 2 bits per real coding dimensions into 118 waveforms. A pulse train of 120 waveform pulses was constructed and emitted using 2 LFM synchronization pulses at the start and end of the pulse train.

Both the CM waveform pulse train and the VM waveform pulse train were emitted using a stationary ground-based L-band test bed capable of transmitting arbitrary preloaded waveforms. However, any known standard radar, or other range finder technique, transmitter can be utilized if the waveform is adjusted accordingly. The pulse trains were transmitted at a bandwidth W=5 MHz and a 10% duty cycle. However, both methods can be utilized with any desired bandwidth and duty cycles. For WT=43 and a 120 pulse train, the transmission parameters correspond to a pulse time of T=8.6 μs and a CPI of 10.32 ms. The transmitted communication data rates for the VM and CM pulse trains, with synchronization pulses and 10% duty cycle, are 438 kbps and 320 kbps, respectively. For comparison a standard LFM pulse train was transmitted in addition to the two data-encoded waveform pulse trains. The test bed includes a loopback system that records the transmitted signal post-amplification to assess waveform distortion. A peak power of 4 kW was used for CM waveforms. For VM waveforms it was necessary to attenuate transmit power by roughly 15 dB to mitigation amplifier distortion. When not transmitting, the test bed recorded returning pulse reflections, serving as a monostatic pulse-Doppler radar. However, a transmitter that allows for simultaneous recording of returning pulse reflections can also be utilized.

Waveforms were transmitted towards a tower approximately 350 m away which included an antenna functioning as a receiver. The antenna fed into a recording system for decoding and analysis. For radar test purposes, a moving target simulator (MTS) at the receiver was used to add a 100 μs delay and a 300 Hz Doppler shift to the signal in real-time before retransmitting it from the tower to simulate pulse reflections from a more distant, moving target. Interference due to short-range ground clutter was fairly strong, likely attributed to a wide transmit elevation beam width (16 deg) and the presence of trees and buildings in the line of site. The 86 μs PRI and the 100 μs MTS were selected to insert the target into the early range bins of the second radar range ambiguity. The target can only be visible by effectively suppressing the interference from ground clutter that spreads in Doppler due to the range-sidelobe modulation effect that is typical of unconstrained waveform-diverse pulse trains.

Figure 9:
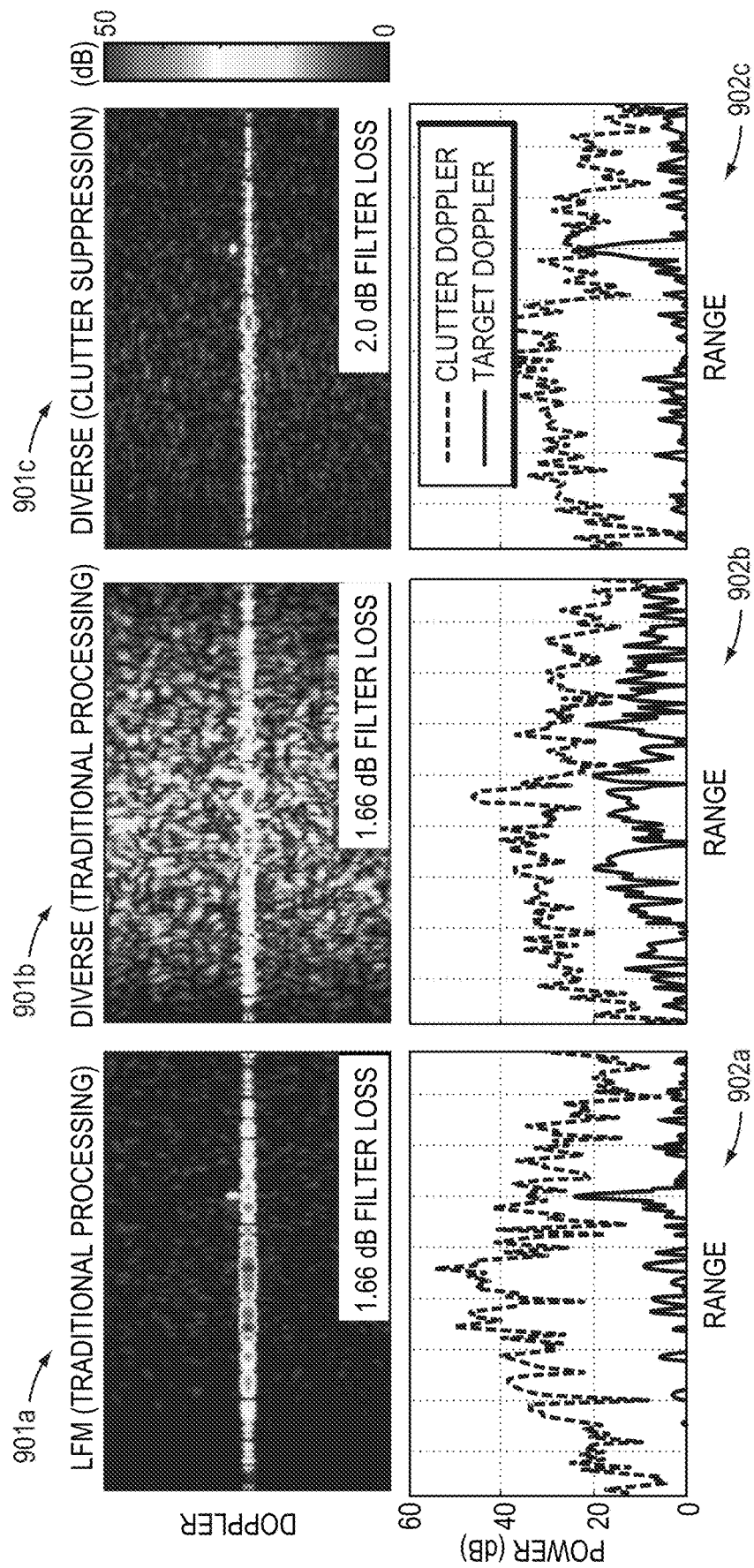
FIG. 9 shows the results of the field test of signals created with variable-modulus waveforms embodiment of the invention.

FIG. 9 shows the results of the field test of signals created with variable-modulus waveforms embodiment of the invention. FIG. 9 includes range-Doppler plots 901a, 901b, and 901c show the output of the transmitter when acting as a monostatic pulse-Doppler radar. Line graphs 902a, 902b, and 902c show what portion of the received return signal is attributed to clutter (dotted line) and the target (solid line). Range-Doppler plot 901a and line graph 902a show the results of a baseline LFM pulse train, processed with a matched filter in range and a 50 dB Chebychev window in Doppler. This yielded an overall filter loss of −1.66 dB. While the target is clearly visible, the LFM pulse train did not include any encoded commination data. Range-Doppler plot 901b and line graph 902b show the results of a matched filter and Chebychev processing to the VM pulse train without applying the low-sidelobe filters guaranteed by the constraint functions. Range-Doppler plot 901b and line graph 902b are representative of prior art methods because they do not utilize any processing techniques to take advantage of the specific parameters of the VM pulse train guaranteed by the constraint functions. Range-Doppler plot 901b shows the expected interference due to range-sidelobe modulation and the target is undetectable. Range-Doppler plot 901c and line graph 902c show the results for the same VM pulse train with the low-sidelobe, low-loss pulse-compression filter applied to take advantage of the waveform properties guaranteed by the methodology disclosed herein. Range-Doppler plot 901c clearly shows the target and graph 902c shows explicit delineation between the target and clutter at the relevant range. Range-Doppler plot 901c illustrates that a VM pulse train that includes encoded data can also be successfully used in radar applications.

The low-sidelobe pulse-compression filters that create the good radar performance shown in range-Doppler plot 901c are guaranteed to exist because the waveforms selected exist on the constraint manifold. The low-sidelobe pulse-compression filters contribute to −1 dB of loss and an additional −1 dB of loss is attributable to the Doppler filters, which are constructed separately for each Doppler bin and range ambiguity. The Doppler filters are deterministically computed using knowledge of the transmit waveforms and a minimal model of the clutter that is to be suppressed. For the example results shown in FIG. 9, a model of the clutter covariance matrix was formed from clutter concentrated at zero Doppler in the first range ambiguity. For each Doppler bin, the filter is computed by covariance inversion with diagonal loading chosen to achieve at most −1 dB of additional filter loss. Other Doppler filter design approaches are useable, including filters adapted to observed clutter in real time, as well as joint range-Doppler filter design in a variety of beam spaces.

Figure 10:
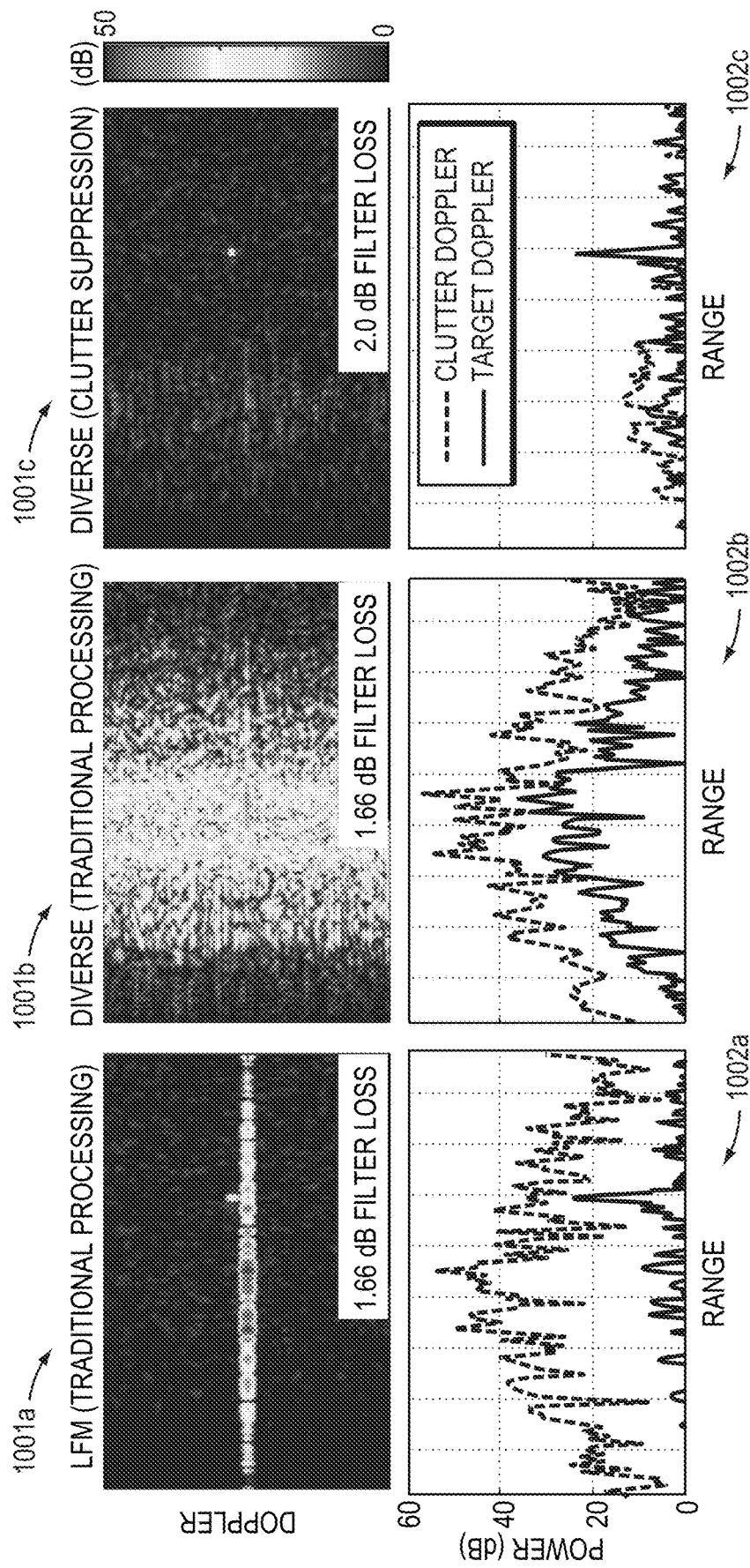
FIG. 10 shows the results of the field test of signals created with constant-modulus waveforms embodiment of the invention.

FIG. 9 shows the results of the field test of signals created with constant-modulus waveforms embodiment of the invention. The corresponding results of the CM waveform pulse train is shown in FIG. 10. FIG. 10 includes range-Doppler plots 1001a, 1001b, and 1001c show the output of the transmitter when acting as a monostatic pulse-Doppler radar. Line graphs 1002a, 1002b, and 1002c show what portion of the received return signal is attributed to clutter (dotted line) and the target (solid line). Range-Doppler plot 1001a and line graph 1002a show the results of a baseline LFM pulse train, processed with a matched filter in range and a 50 dB Chebychev window in Doppler. This yielded an overall filter loss of −1.66 dB. While the target is clearly visible, the LFM pulse train did not include any encoded commination data. Range-Doppler plot 1001b and line graph 1002b show the results of a matched filter and Chebychev processing to the CM pulse train without applying constraint functions. Range-Doppler plot 1001b and line graph 1002b are representative of prior art methods because they do not utilize any processing techniques to take advantage of the specific parameters of the VM pulse train guaranteed by the constraint functions. Range-Doppler plot 1001b shows the expected interference due to range-sidelobe modulation and the target is undetectable. Range-Doppler plot 1001c and line graph 1002c show the results the same CM pulse train with constraint functions for low-sidelobe, low-loss pulse-compression filter applied to take advantage of the waveform properties guaranteed by the methodology disclosed herein. Range-Doppler plot 1001c clearly shows the target and graph 1002c shows explicit delineation between the target and cluster at the relevant range. Range-Doppler plot 1001c illustrates that a CM pulse train that includes encoded data can also be successfully used in radar applications. As a byproduct of the initial ambient space CM waveform construction, pulse-to-pulse variation is large enough to disambiguate in range even in the presence of strong clutter as shown by range-Doppler plot 1001c.

FIGS. 9 and 10 and range-Doppler plots 901c and 1001c show that both the CM and VM waveform pulses are viable radar waveforms that can be used by radar systems to clearly identify moving targets in the presence of significant ground clutter. Recordings of the transmitted waveform pulses were initially processed and decoded with a basic synchronization procedure using matched-filtering on the first and last marker pulses to estimate timing, phase, and frequency offset to a high degree of accuracy. Once synchronized, the data encoded in the pulses was successfully decoded. Additional synchronization and interference mitigation methods can also be applied to further improve communication performance.

Figure 11:
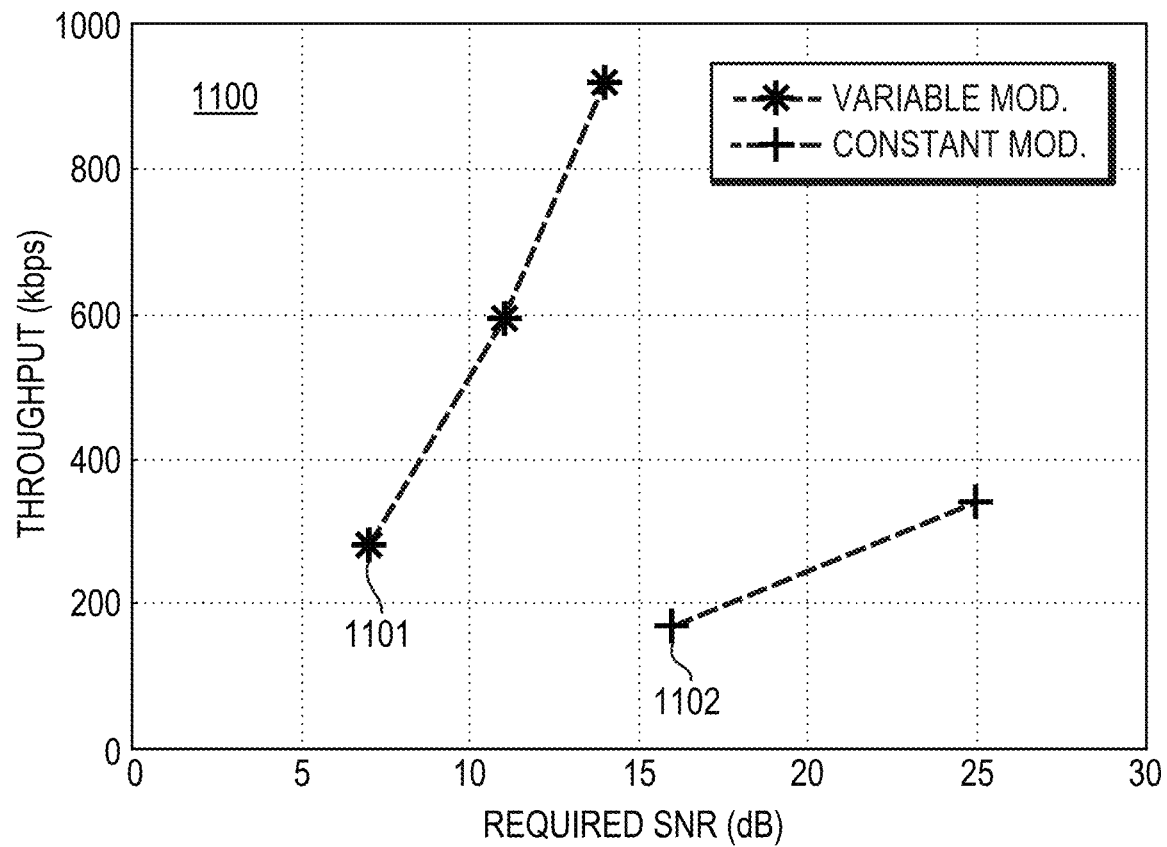
FIG. 11 is a graph showing the relationship between throughput and SNR for the variable-modulus waveforms and constant-modulus waveforms embodiments of the invention performed in the field test.

FIG. 11 is a graph showing the relationship between throughput and SNR for the variable-modulus waveforms and constant-modulus waveforms embodiments performed in the cluster suppression test. Graph 1100 plots the throughput and required SNR for communication data encoded in variable-modulus waveforms 1101 and constant-modulus waveforms 1102 that satisfy the constraint functions for "good" radar performance in the cluster suppression test. Active transmission throughputs can reach up to ten times higher than the values in FIG. 11 when not limited by a 10% duty cycle. Simulated white Gaussian noise was added to the high-SNR received signals prior to synchronization and decoding to estimate the required SNR at the communications receiver and decoder for error-free decoding at the coded data rates. The VM waveforms decoded without errors at SNRs of 13 dB or higher. The CM waveforms required 25 dB of SNR at the receiver. These SNR requirements are well within the range of the power transmitted by radar transmitters.

When decoding the pulses, each tangent coordinate was estimated from the received pulses with a linear filter designed to maintain excellent gain on the tangent direction while suppressing components of the base point $s_b$ as clutter. In a purely white noise regime, this is simply the orthogonal projection operator. For additional stability, the test also accounted for distortion from sub-bin multipath effects with filters designed to suppress time-delayed versions of $s_b$ over small delay values (¼ of a chip). Additional or alternative filters can be utilized to account for a wide range of expected or measured distortion. Other channel equalization techniques are known to one of ordinary skill in the art and can be adapted for the methods disclosed herein. In longer range embodiments, multipath effects may be accounted for with channel estimations that can account for multipath delays over several chips.

One variant embodiment is a passive radar application. This embodiment uses "communication signals for radar" rather than "radar signals for communication". Standard communication signals aren't optimal for radar applications, but they can be used when there is a desire for it (e.g., Air Traffic Control applications). By using the same waveforms for radar and communication, they're applicable in either direction—so, e.g. if cell towers communicate using a "radar mode" that tweaks the transmit signals to be better suited for radar signal processing, nearby radars could more effectively use the reflections of those local communication signals.

Additional alternative embodiments can also encode data in the normal dimensions local to point p. Encoding data in the normal dimensions can be done essentially by the same procedure as the tangent dimensions within the communication plane, but instead of encoding data as a tangent distance relative to point p, data can be encoded as a distance relative to the manifold boundary (e.g., how far into the interior of the manifold is the waveform point located). Once received, decoding the normal component would depend upon accurately decoding the tangential pieces, since the manifold boundary will vary with tangential component. This would introduce additional noise into the normal component estimation and may require significant amounts of additional processing.

Modern vehicles are increasingly outfitted with sensors for safety and autonomous operation, including radar. A transmitter could coordinate with nearby vehicles over wireless communications channels while simultaneously acting as a radar system for guidance, safety and/or other operations There is interest in air traffic control using passive radar, i.e. detecting aircraft from reflection of wireless signals from commercial broadcasts, etc. Current communications signals are sub-optimal for this application. Using the disclosed method, air traffic control can identify and use communication signals that also function as radar signals. Furthermore, the signals can be customized for individualized needs through the selection of a range of constraint functions and parameters.

In general, there is a desire to open additional radio spectrum up for communications use that is currently reserved for radar. The disclosed method allows for the simultaneous use of a spectrum range for both radar and communications purposes. Furthermore, the disclosed method provides for greater throughput and flexibility than any other disclosed prior art spectrum sharing method.

Figure 12:
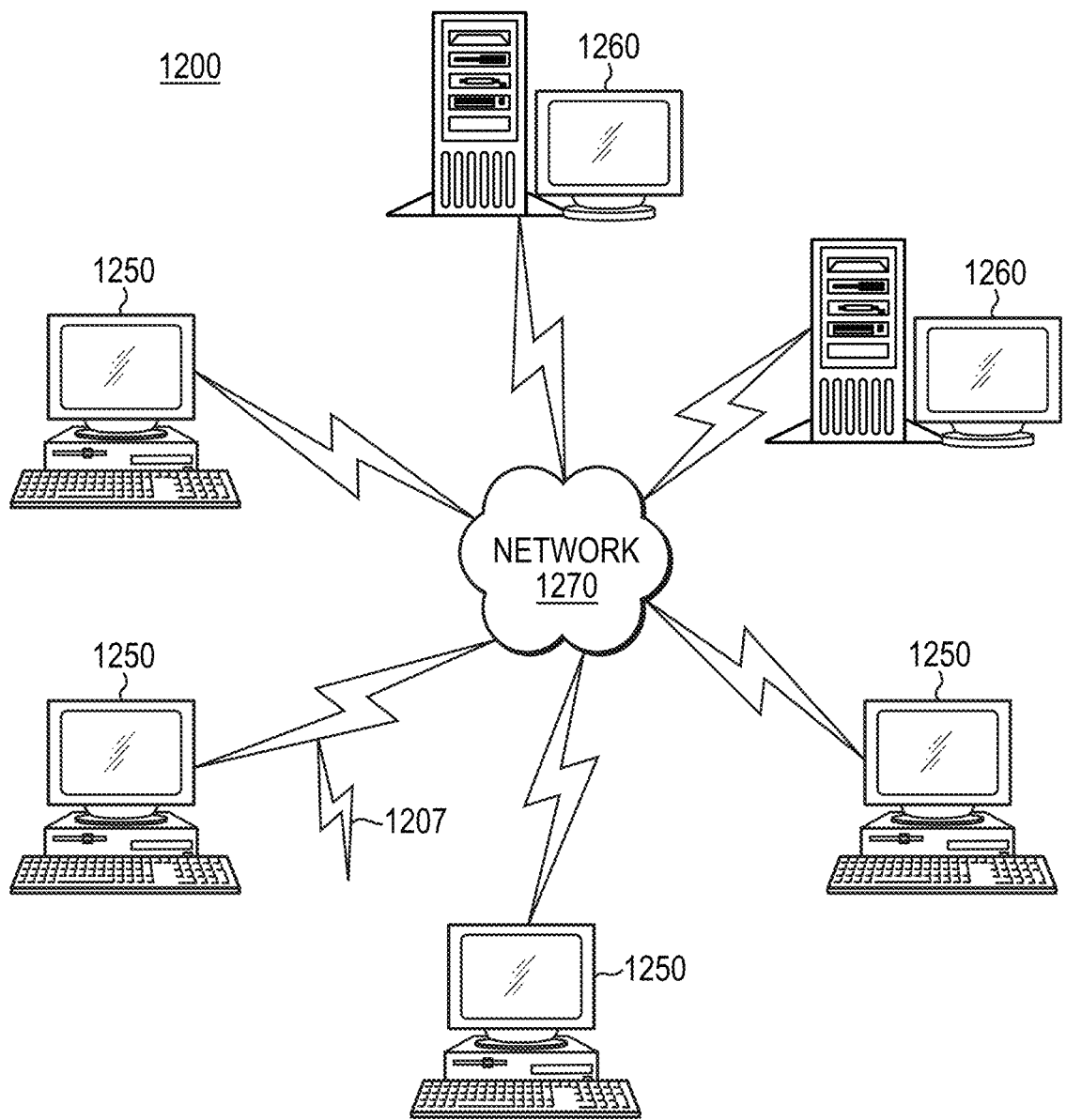
FIG. 12 illustrates a computer network or similar digital processing environment in which embodiments of the present invention may be implemented.

Example implementations of a computing system used for steps of a method for high-throughput wireless communications encoded using radar waveforms may be implemented in a software, firmware, or hardware environment. FIG. 12 illustrates a computer network or similar digital processing environment in which embodiments (e.g., system 1200) of the present invention may be implemented.

Client computer(s)/devices 1250 and server computer(s) 1260 provide processing, storage, and input/output devices executing application programs and the like. Client computer(s)/devices 50 can also be linked through communications network 1270 to other computing devices, including other client devices/processes 1250 and server computer(s) 1260. Communications network 1270 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Client computers/devices 1250 and server computer(s) 1260 may execute any of the computation steps or processes of embodiments of the invention. Client computers/devices 1250 and server computer(s) 1260 may store any of the data utilized in the steps or processes of embodiments.

Figure 13:
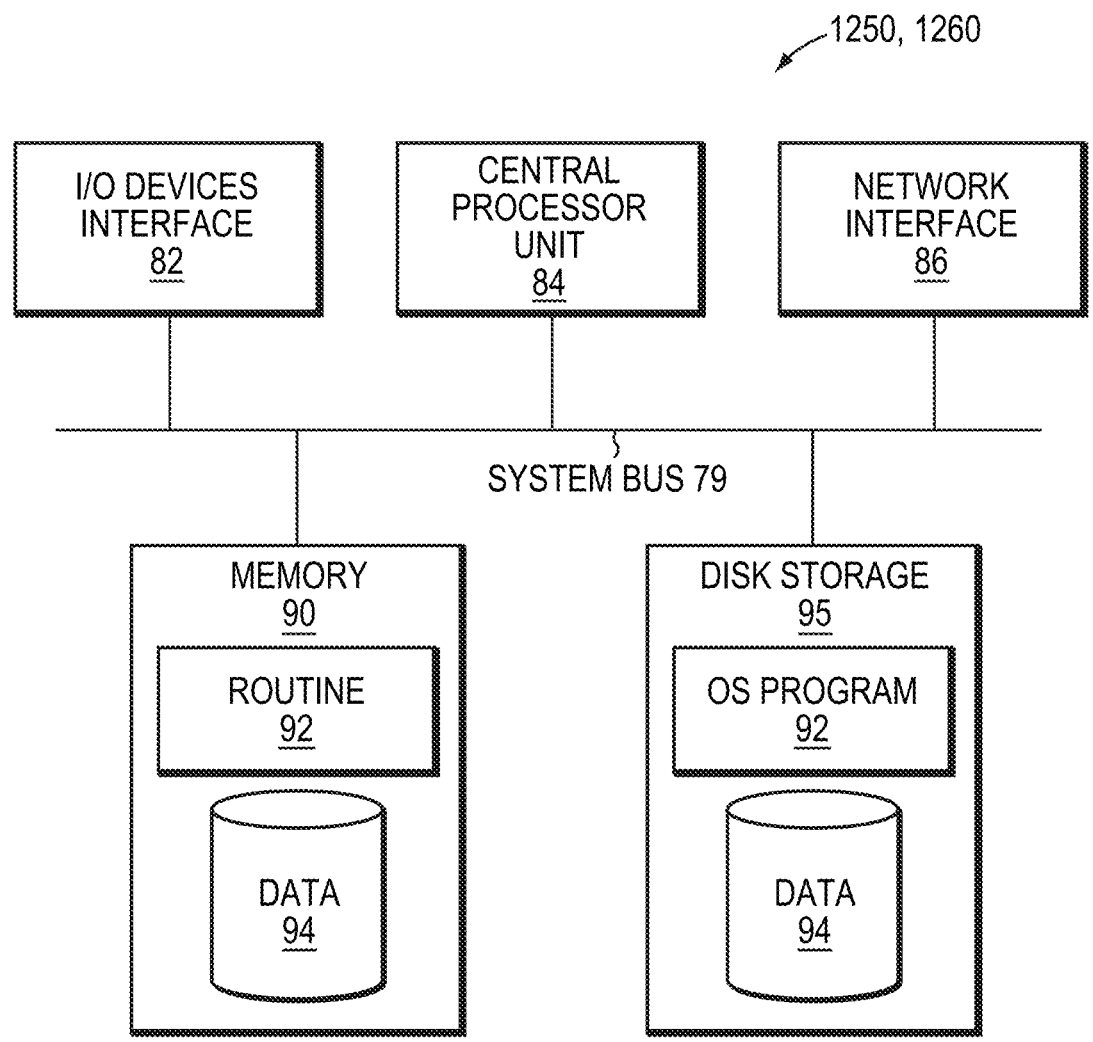
FIG. 13 is a diagram of the internal structure of a computer (e.g., client processor/device or server computers) in the computer system of FIG. 12.

FIG. 13 is a diagram of the internal structure of a computer (e.g., client processor/device 1250 or server computers 1260) in the computer system of FIG. 12. Each computer 1250, 1260 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 1250, 1260. Network interface 86 allows the computer 1250, 1260 to connect to various other devices attached to a network (e.g., network 1270 of FIG. 1). Memory 90 provides volatile storage for computer software instructions 92 and data 94 used to implement steps of an embodiment 1200 of the present invention. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1207 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

What is claimed is:

1. A system comprising
an input configured to receive waveform constraints, the waveform constraints defining a set of optimal waveforms within a multidimensional vector space, each point within the multidimensional vector space representing a waveform of a pulse time and a bandwidth;
a backend configured to:
determine a manifold, in the multidimensional vector space, composed of the set of optimal radar waveforms;
select a base point on the manifold; and
identify a communication plane containing the point on the manifold;
an encoder configured to:
select a communication waveform contained in the communication plane representing communication data; and
determine, based on the selected communication waveform, a desired waveform pulse located on the manifold, the desired waveform pulse representing the communication data of the selected communication waveform;
a transmitter configured to emit the desired waveform pulse.

2. The system of claim 1 wherein the transmitter is a radar transmitter and the waveform constraints are radar performance specifications.

3. The system of claim 2 further comprising a radar receiver configured to receive a return signal of the emitted desired waveform pulse and measure at least one of its time delay and Doppler shift.

4. The system of claim 2 wherein the radar performance specifications include quantities characterizing the optimal achievable responses of waveforms to range and/or Doppler filters.

5. The system of claim 2 wherein the radar performance specifications include quantities characterizing the optimal achievable responses of waveforms to a computationally-desirable subset of range and/or Doppler filters.

6. The system of claim 1 wherein the communication plane is tangent to the manifold.

7. The system of claim 6 wherein, for both the selected communication waveform and the desired waveform, the communication data is represented by displacement from the base point along directions tangent to the manifold.

8. The system of claim 1 wherein the backend is further configured to define a local region of the communication plane containing a set of communications waveforms that compose an alphabet of communication data, the set of communications waveforms including the selected communications waveform.

9. The system of claim 8 wherein the backend is further configured to define a boundary of the region of the communication plane communication plane based upon the geometry of the manifold.

10. The system of claim 1 wherein the backend is further configured to select the base point on the manifold based on second order operations performed on the manifold.

11. The system of claim 1 wherein the encoder is configured to determine the desired waveform pulse by determining a point of intersection of a normal line to the communication plane, at the selected communication waveform, with the manifold, the point of intersection representing the desired waveform pulse.

12. The system of claim 1 wherein the backend is further configured to select at least one additional base point on the manifold and identify additional communication planes containing the additional base points and; the encoder is further configured to utilize a multilevel encoding scheme with the choice of communication plane representing additional communication data.

13. The system of claim 1 wherein the backend is further configured to determine an additional manifold in the multidimensional vector space, composed of an additional set of waveforms defined by additional waveform constraints, the manifold being a submanifold of the additional manifold and the set of optimal waveforms being a subset of the additional set of waveforms.

14. The system of claim 13 wherein the additional waveform constraints require constant modulus waveforms.

15. A communication device comprising:
an input configured to receive waveform constraints, the waveform constraints defining optimal waveforms;
a processor configured to:
 select a base waveform from the optimal waveforms;
 determine a communication plane containing the base waveform;
 map communication data to a set of communication waveforms in the communications plane; and
 project the set of communication waveforms onto a subset of the optimal waveforms;
a transmitter configured to emit a waveform from the subset of optimal waveform, the emitted waveform satisfying the waveform constraints and inducing transmitted communication data;
a decoder configured to:
 receive the emitted radar waveform; and
 determine the transmitted communications data based on a reverse projection of the emitted radar waveform onto the communication plane.

16. The communication device of claim 15 wherein the processor is comprised of a backend and an encoder.

17. The communication device of claim 15 wherein the optimal waveforms comprise a parameterized manifold and the subset of optimal waveforms comprise a local patch of the parameterized manifold.

18. The communication device of claim 15 wherein the decoder is further configured to determine additional communications data based on selection of the base waveform.

19. A radar device comprising:
a memory storing:
 a set of radar waveforms defined by waveform constraints; and
 a communication plane surrounding a base waveform from the set of radar waveforms, the communication plane containing a set of communication waveforms representing communication data;
an encoder configured to
 select a commutation waveform; and
 project the selected communications waveform onto a desired waveform from the
 set of radar waveforms defined by waveform constraints;
a radar transmitter configured to:
 emit the desired waveform, the desired radar waveform satisfying the waveform constraints and being a projection of a communications waveform representing communications data; and
a radar receiver configured to:
 detect a reflection of the emitted desired waveform.

20. The radar device of claim 19 wherein the radar transmitter is the radar receiver.

21. The radar device of claim 20 wherein the radar transmitter utilizes simultaneous transmit and receive technology.

22. The radar device of claim 19 wherein the waveform constraints include quantities characterizing the optimal achievable responses of waveforms to range and/or Doppler filters.

* * * * *